(12) United States Patent
Bozzini et al.

(10) Patent No.: US 9,965,179 B2
(45) Date of Patent: *May 8, 2018

(54) ADAPTIVE VIRTUAL KEYBOARD

(71) Applicant: THOMSON LICENSING, Issy de Moulineaux (FR)

(72) Inventors: Roger Dominik Bozzini, Schaffhausen (CH); Anton Werner Keller, Ami (CH)

(73) Assignee: THOMSON LICENSING, Issy les Moulineaux (FR)

( * ) Notice: Subject to any disclaimer, the term of this patent is extended or adjusted under 35 U.S.C. 154(b) by 411 days.

This patent is subject to a terminal disclaimer.

(21) Appl. No.: 14/437,980

(22) PCT Filed: Nov. 27, 2012

(86) PCT No.: PCT/IB2012/002512
§ 371 (c)(1),
(2) Date: Apr. 23, 2015

(87) PCT Pub. No.: WO2014/083369
PCT Pub. Date: Jun. 5, 2014

(65) Prior Publication Data
US 2015/0301740 A1 Oct. 22, 2015

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 3/0486* (2013.01); *G06F 3/04842* (2013.01); *G06F 3/04847* (2013.01)

(58) Field of Classification Search
CPC ............... G06F 3/04886; G06F 3/0482; G06F 3/04842; G06F 3/048
See application file for complete search history.

(56) References Cited

U.S. PATENT DOCUMENTS 7,103,852 B2  9/2006 Kairis, Jr.
8,698,764 B1*  4/2014 Karakotsios .......... G06F 1/1692
                                              345/173
(Continued)

FOREIGN PATENT DOCUMENTS

CN    101231554    7/2008
EP     1998245    12/2008
(Continued)

OTHER PUBLICATIONS

Camarda: Special Edition Using Microsoft word 2002, Jun. 18, 2001, Published by Que, pp. 467-471.
(Continued)

*Primary Examiner* — Jeanette J Parker
(74) *Attorney, Agent, or Firm* — Meagher Emanuel Laks Goldberg & Liao, LLP

(57) ABSTRACT

A method allows a portion of a virtual keyboard to be partially invisible and allows a user to activate keys in that portion when the invisible part is hit. According to an exemplary embodiment, the method is used in a touch screen device and includes steps of: presenting a virtual keyboard, wherein all of the virtual keyboard is displayed on the screen and falls on a first portion of touch-sensitive elements; moving the virtual keyboard, in response to a user input, to a position in which some keys including a first key of the virtual keyboard are partially displayed on the screen and are visible, the visible portions of those partially displayed keys fall on the first portion of the touch-sensitive elements and invisible portions fall on the second portion of the touch-sensitive elements, the first key covers a first portion of the first portion of the touch-sensitive elements and a first portion of the second portion of the touch-sensitive elements; and when the first key is hit, performing a particular function assigned to the first key.

14 Claims, 29 Drawing Sheets

(51) Int. Cl.
*G06F 3/0484* (2013.01)
*G06F 3/0486* (2013.01)

(56) References Cited

U.S. PATENT DOCUMENTS

| | | | |
|---|---|---|---|
| 2002/0118175 A1* | 8/2002 | Liebenow | G06F 1/1626 345/168 |
| 2003/0181228 A1 | 9/2003 | Kim | |
| 2004/0218963 A1 | 11/2004 | Van Diepen et al. | |
| 2005/0122313 A1 | 6/2005 | Ashby | |
| 2005/0248525 A1 | 11/2005 | Asai | |
| 2006/0077179 A1 | 4/2006 | Hsu et al. | |
| 2007/0277116 A1 | 11/2007 | Nakajima | |
| 2008/0150909 A1 | 6/2008 | North et al. | |
| 2009/0046076 A1 | 2/2009 | Bychkov et al. | |
| 2009/0146957 A1 | 6/2009 | Lee et al. | |
| 2009/0174667 A1 | 7/2009 | Kocienda et al. | |
| 2009/0183098 A1 | 7/2009 | Casperian | |
| 2010/0025956 A1 | 2/2010 | Raynor | |
| 2010/0103116 A1 | 4/2010 | Leung et al. | |
| 2010/0109999 A1* | 5/2010 | Qui | G06F 3/0213 345/156 |
| 2010/0156808 A1 | 6/2010 | Stallings et al. | |
| 2010/0245252 A1 | 9/2010 | Ghassabian | |
| 2010/0259561 A1 | 10/2010 | Forutanpour et al. | |
| 2010/0265183 A1 | 10/2010 | Mail | |
| 2010/0277414 A1 | 11/2010 | Tartz et al. | |
| 2010/0287469 A1 | 11/2010 | Wang et al. | |
| 2010/0302212 A1 | 12/2010 | Weber et al. | |
| 2011/0017937 A1 | 1/2011 | Luo et al. | |
| 2011/0154246 A1 | 6/2011 | Oh et al. | |
| 2011/0157090 A1 | 6/2011 | Parihar et al. | |
| 2011/0179374 A1 | 7/2011 | Yagi et al. | |
| 2011/0202876 A1 | 8/2011 | Badger et al. | |
| 2011/0205163 A1 | 8/2011 | Hinckley et al. | |
| 2011/0261058 A1* | 10/2011 | Luo | G06F 1/1626 345/441 |
| 2012/0075194 A1 | 3/2012 | Ferren | |
| 2012/0144337 A1 | 6/2012 | Archer et al. | |
| 2012/0154408 A1 | 6/2012 | Yukawa et al. | |
| 2012/0166995 A1 | 6/2012 | McAleer | |
| 2012/0242594 A1 | 9/2012 | Matsumoto | |
| 2012/0260207 A1* | 10/2012 | Treskunov | G06F 3/04886 715/773 |
| 2013/0063359 A1 | 3/2013 | Kuhl et al. | |
| 2013/0263039 A1 | 10/2013 | Fahlgran | |
| 2013/0300590 A1 | 11/2013 | Dietz | |
| 2015/0293694 A1* | 10/2015 | Bozzini | G06F 3/0219 715/773 |

FOREIGN PATENT DOCUMENTS

| | | |
|---|---|---|
| EP | 2234007 | 9/2010 |
| JP | 2007317032 | 12/2007 |
| JP | 2012133453 A | 7/2012 |
| JP | 2012212409 A | 11/2012 |
| KR | 2003046891 | 6/2003 |
| KR | 1064836 | 9/2011 |
| KR | 2012007042 | 1/2012 |
| WO | WO2005094430 | 10/2005 |
| WO | WO2011131989 | 10/2011 |
| WO | WO2012075197 | 6/2012 |
| WO | WO2012110678 | 8/2012 |

OTHER PUBLICATIONS

Camarda, "Special Edition Using Microsoft Word 2002", by Que, Chapter 16 pp. 467-471.
Himberg et al., "On-line Personalization of a Touch Screen Based Keyboard," Conference Paper, 2003 International Conference on Intelligent User Interfaces (IUI'03), Jan. 12, 2003, 8 pages.
Rudehenko et al., "Text Text Revolution: A Game that Improves Text Entry on Mobile Touchscreen Keyboards," Conference Paper, Proceedings of the 9th International Conference on Pervasive Computing, Jun. 12, 2011, Springer Verlag, 8 pages.

* cited by examiner

ADAPTIVE VIRTUAL KEYBOARD

This application claims the benefit, under 35 U.S.C. § 365 of International Application PCT/IB2012/002512 filed Nov. 27, 2012 which was published in accordance with PCT Article 21(2) on Jun. 5, 2014 in English.

BACKGROUND OF THE INVENTION

Field of the Invention

The present invention generally relates to methods and apparatuses for presenting virtual keyboards on a touch screen, and more particularly, to methods and apparatuses for presenting a virtual keyboard with some keys partially or fully extend beyond the screen, dynamically adapting a virtual keyboard to a particular typing habits of a user, and allowing a user to customize a keyboard layout including adding/deleting keys and changing key positions.

Background Information

A "virtual" or "soft" keyboard is a keyboard depicted on a touch screen and the keystrokes or hits are registered by a touch detecting function. It is not a hardware keyboard, which is located external to the touch screen.

Many modern hand-held computers, such as a tablet, have a touch screen and usually provide a virtual keyboard on the touch screen. Often the size and key arrangement of the virtual keyboard do not match the size of the writer's hands, for reasons such as the touch screen size is fixed and limited, and the sizes of palms and fingers are different from writer to writer. As touch screens become cheaper, touch screens capable of displaying a full size virtual keyboard similar to external standard keyboards become more and more popular. However, the full size virtual keyboard is still fixed in key arrangement, and fixed in size, shape, and relative distance between two keys. As such, it cannot match the hands of all writers. Accordingly, there is a need in the art to address the foregoing issues and thereby provide improved methods and apparatuses for presenting virtual keyboards in a touch screen device.

SUMMARY OF THE INVENTION

In accordance with an aspect of the present invention, a touch screen device is disclosed. The touch screen device comprises a screen; touch-sensitive elements, a first portion of the touch-sensitive elements being arranged inside the screen and a second portion of the touch-sensitive elements is arranged outside of the screen; and a processor coupled to the screen and the touch-sensitive elements, the processor outputting a first virtual key to a first portion of the screen and moving the first virtual key from the first portion of said screen responsive to a user input to a position in which to the first virtual key is partially displayed on the screen and covers a first portion of the first portion of the touch-sensitive elements and an invisible portion of the first virtual key covers a first portion of the second portion of the touch-sensitive elements, the first virtual key if hit causing the processor to perform a particular function.

In one embodiment, the processor is operative to detect a signal indicating which one of the touch-sensitive elements has been hit and responsive to detecting of the first portion of the first portion of the touch-sensitive elements being hit, the processor executes the particular function.

In another embodiment, responsive to detecting of the first portion of the second portion of the touch-sensitive elements being hit, said processor may also execute the particular function.

In yet another embodiment, the processor moves the first virtual key to a position in which all of said first virtual key is invisible and covers a second portion of the second portion of the touch-sensitive elements and responsive to detecting of the second portion of the second portion of the touch-sensitive elements (320) being hit, the processor executes said particular function.

In yet another embodiment, the processor outputs a virtual keyboard including the first virtual key and moves the virtual keyboard to a position in which some virtual keys including the first virtual key are partially displayed on the screen and fall on the first portion of the touch-sensitive elements, and invisible portions of those virtual keys fall on the second portion of the touch-sensitive elements, responsive to detecting of the first portion of the first portion of the touch-sensitive elements being hit, the processor executes the particular function, and responsive to detecting of the first portion of the second portion of the touch-sensitive elements being hit, the processor also executes the particular function.

In yet another embodiment, the processor moves the virtual keyboard to a position in which some virtual keys are completely invisible and fall on said second portion of said touch-sensitive elements, the first virtual key covers a second portion of the second portion of the touch-sensitive elements, and responsive to detecting of the second portion of the second portion of the touch-sensitive elements being hit, the processor executes the particular function.

In one embodiment, the first and second portions of the touch-sensitive elements are next to each other in a consecutive manner. In another embodiment, the first and second portions are non-consecutive. For example, the screen is located in a first side of the touch screen device and the second portion is located on a second side other than the first side of the touch screen device. In yet another embodiment, the second portion includes a second key and the processor displays on the screen a third key indicating a location of the second key in the second side, and when one of the second and third keys is hit, the processor performs a second function assigned to the second key.

In accordance with another aspect of the present invention, a method for presenting a virtual keyboard comprising a plurality of keys on a touch screen device comprising a screen and touch-sensitive elements, a first portion of the touch-sensitive elements being arranged inside the screen and a second portion of the touch-sensitive elements is arranged outside of the screen is disclosed. The method comprises presenting the virtual keyboard, wherein all of the virtual keyboard is displayed on the screen and falls on the first portion of the touch-sensitive elements; moving the virtual keyboard, in response to a user input, to a position in which some keys including a first key of the virtual keyboard are partially displayed on the screen and are visible, the visible portions of those partially displayed keys fall on the first portion of the touch-sensitive elements and invisible portions fall on the second portion of the touch-sensitive elements, the first key covers a first portion of the first portion of the touch-sensitive elements and a first portion of the second portion of the touch-sensitive elements; and the method further comprises when the first key is hit, performing a particular function assigned to the first key.

In one embodiment, the performing step is performed if a hit on one of the first portion of said first portion of the touch-sensitive elements and the first portion of the second portion of the touch-sensitive elements is detected.

In one embodiment, even if the first key is completely falls inside a first portion of the second portion and is completely invisible, when a hit on the first portion of the second portion of the touch-sensitive elements is detected, the performing step is performed.

In yet another embodiment, the screen is located on a first side of the touch screen device, the second portion of the touch-sensitive elements is located on a second side of the touch screen device other than the first side, the second portion of the touch-sensitive elements include a second key, and the method further comprises displaying on the screen a third key indicating a location of the second key in the second side. The method further comprises when the second key is hit, performing a second function assigned to the second key. In one embodiment, the method further comprises when the third key is hit, performing the second function.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
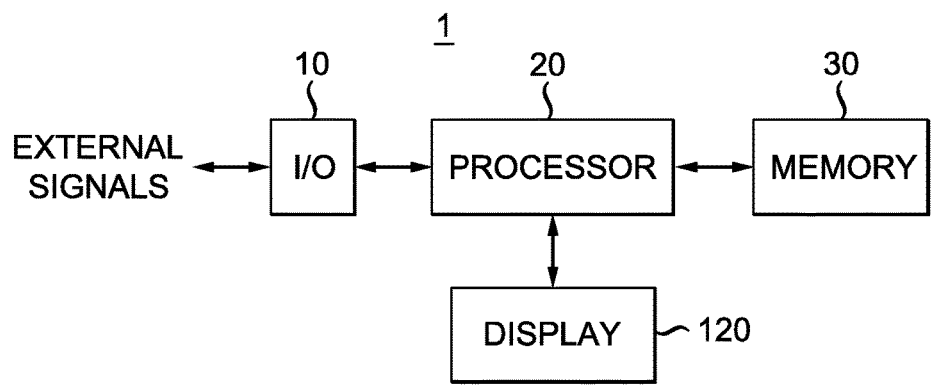
FIG. 1 shows a block diagram of a touch screen device according to an exemplary embodiment of the present invention.

Referring to FIG. 1, an exemplary, non-limiting aspect of a portable computing device (PCD) is shown and is generally designated 1. As shown, the PCD 1 comprises input/output (I/O) means such as I/O block 10, processing means such as processor 20, memory means such as memory 30, and user interface which includes a display 120 and optionally a keypad (not shown) having some hardware keys to complement a virtual keyboard. Although illustrating a PCD as the touch screen device, the principles of invention can be applied to any apparatus and device, portable or not, having a display with touch-sensitive screen. The display may be any display, such as LCD, OLED, electronic Ink, and plasmas, and the display may be a part of a TV, a PC, a mobile phone, a tablet, a digital camera, a camcorder, and a DVD player. The display may be used with a set-top box and any of the above-mentioned devices. For simplicity and clarity of description, identical elements are referred to using identical reference numerals in all figures and certain conventional elements associated with the PCD 1 such as certain control signals, power signals and/or other elements may not be shown in FIG. 1.

I/O block 10 is operative to perform I/O functions of the PCD 1. According to an exemplary embodiment, I/O block 10 may be operative to receive signals such as audio, video and/or data signals in analog and/or digital format from a broadcast source such as an Internet source, and other devices such as a PC, a hard disk connected through, for example, USB, network, or HDMI interfaces. I/O block 10 may also be operative to output signals to an external device.

Processor 20 is operative to perform various signal processing and control functions of the PCD 1. According to an exemplary embodiment, processor 20 processes the audio, video and/or data signals provided from I/O block 10 by performing functions including tuning, demodulation, forward error correction, transport processing, if necessary, and decompressing functions to thereby generate digital data representing audio, video and/or data content. The digital data produced from such processing functions may be provided for further processing and/or output to the display 120.

Processor 20 is also operative to execute software code that facilitates and enables performance of the various embodiments and methods of the present invention described herein. Further details regarding these aspects of the present invention will be provided later herein. Processor 20 is also operative to perform and/or enable other functions of the PCD 1 including, but not limited to, executing programs stored in the memory 30, processing user inputs made via touching the touch-sensitive elements located inside or outside the area of the screen of the display 120, and user inputs from other user input devices (not shown), administering one or more timers, enabling on-screen displays, reading and writing data from and to memory 30, and/or other operations. Processor 20 may be embodied using one or more integrated circuits (ICs).

According to the principles of the invention, the processor 20 may be operative to detect touching (or a touch) on the area having touch-sensitive elements; display a soft or virtual keyboard on the display 120 in response to a user signal such as touching or hitting a predefined position in the area having touch-sensitive elements or placing figures on the screen of the display 120 in a predetermined manner. More details will follow.

Memory 30 is operatively coupled to processor 20 and performs data storage functions of the PCD 1. Depending on implementation, at least a portion of memory 30 may be included on the same IC(s) as processor 20. According to an exemplary embodiment, memory 30 stores data including, but not limited to, software code, on-screen display (e.g., menu, virtual keyboard) data, user selection/setup data, a signature representing a user, a hit footprint of a key of a virtual keyboard, and/or other data. The memory 30 may also include a hard disk drive (HDD), or DVD drive, PROM, SRAM, or combination thereof.

The screen of the display 120 may cover an entire touch-sensitive area or a portion of a touch-sensitive area. In other words, the touch-sensitive area may extend beyond the area of the screen for the display 120. The touch-sensitive area includes conventional touch-sensitive elements. The processor 20 is operative to detect which elements are touched in a conventional manner.

Figure 2:
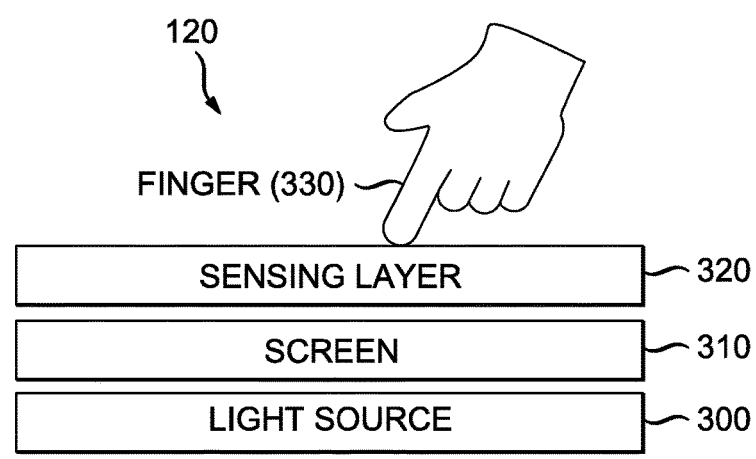
FIG. 2 shows exemplary components of display 120 of the touch screen device shown in FIG. 1.
Figure 3:
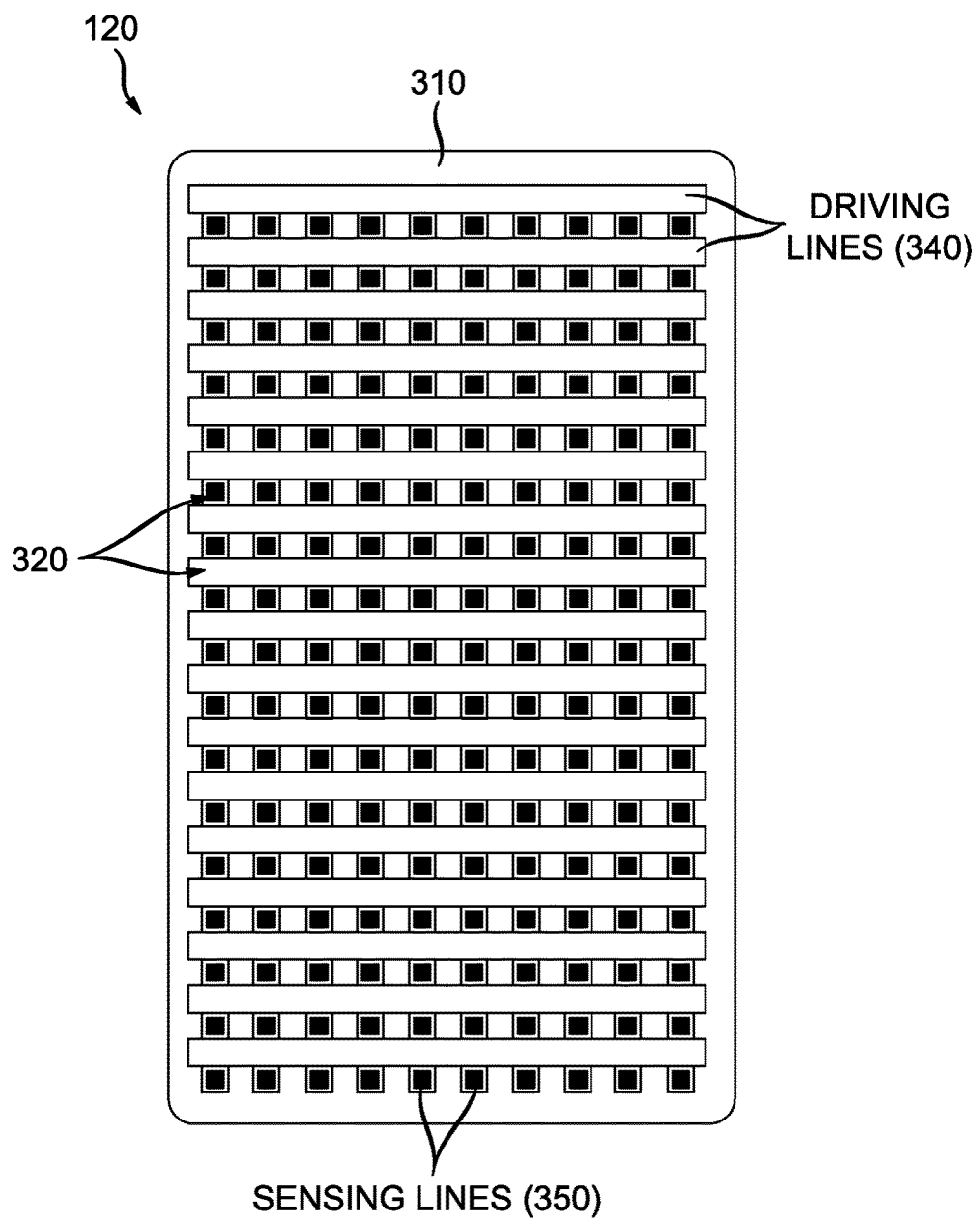
FIG. 3 shows a different view of the exemplary components of display 120 of the touch screen device shown in FIG. 1.

FIGS. 2 and 3 depict diagrams of exemplary components of display 120 of the PCD 1. As shown, display 120 may include a light source 300, a screen 310, and a sensing layer 320. The sensing layer 320 includes touch-sensitive elements and as pointed out above, may extend beyond the screen 310 and may not cover all the area of the screen 310.

Light source 300 may include a mechanism (e.g., a backlight) that provides backlighting to a lower surface of screen 310 in order to display information. For example, light source 300 may include one or more incandescent light bulbs, one or more light-emitting diodes (LEDs), an electroluminescent panel (ELP), one or more cold cathode fluorescent lamps (CCFL), one or more hot cathode fluorescent lamps (HCFL), etc. that illuminate portions of screen 310. Incandescent light bulbs may be used when very high brightness is desired. LEDs may be used in small, inexpensive lighting arrangements, and may include colored or white light. An ELP may be used for larger lighting arrangements or when even lighting is desired, and may be either colored or white. CCFLs may be used in large lighting arrangements and may be white in color. In another example, light source 300 may employ one or more diffusers or light guides to provide even lighting from an uneven source. In still another example, light source 300 can include any color light source (e.g., yellow, green, blue, white, etc.) or any combination of colored/non-colored light sources. The light provided by light source 300 may also be used to provide front lighting to an upper surface of screen 310 that faces a user. In case that the display is of a type of liquid ink, OLED or any other type, that do not need a backlighting source, light source 300 can be omitted.

Screen 310 may include any mechanism capable of providing visual information (e.g., text, images, video, incoming or outgoing calls, games, phone books, the current time, emails, etc.) to a user. For example, screen 310 may include a liquid crystal display (LCD), such as a thin film transistor (TFT) LCD, etc. In one exemplary implementation, screen 310 may include a plastic substrate that arranges TFT on a metal foil (rather than on glass), which may permit screen 310 to recover its original shape after being bent. Screen 310 may include a color filter coated onto the plastic substrate, which may permit screen 310 to display color images. In other implementations, screen 310 may include a monochrome, flexible LCD.

In one implementation, screen 310 may include any number of color and/or monochrome pixels. In another implementation, screen 310 may include a passive-matrix structure or an active-matrix structure. In a further implementation, if screen 310 is a color array, each pixel may be divided into three cells, or subpixels, which may be colored red, green, and blue by additional filters (e.g., pigment filters, dye filters, metal oxide filters, etc.). Each subpixel may be controlled independently to yield numerous possible colors for each pixel. In other implementations, each pixel of screen 310 may include more or less than three subpixels of various colors other than red, green, and blue.

Sensing layer 320 may include touch-sensitive elements that detect the presence of a user's finger 330 (e.g., a thumb, an index finger, a middle finger, a ring finger, or a pinkie finger) on display 120, detect the location (or touch area) of finger 330 on display 120, determines how many fingers a user has on display 120, etc. For example, sensing layer 320 may include a layer of capacitive material (e.g., provided under a protective covering (not shown)) that may experience a change in electrical charges (e.g., a change in the amount of charge stored) when finger 330 contacts sensing layer 320. In one exemplary implementation, sensing layer 320 may include self capacitance circuitry that includes an array of electrodes and monitors changes in the array of electrodes when a user contacts sensing layer 320 (e.g., with finger 330). In another exemplary implementation, as shown in FIG. 3, sensing layer 320 may include a layer of driving lines 340 that carry current, and a separate layer of sensing lines 350 that detect changes in electrical charge when a user contacts sensing layer 320 (e.g., with finger 330).

Sensing layer 320 may sense a change associated with its electrical properties every time a user contacts sensing layer 320, and may provide this information to processor 20 and/or memory 30. Processor 20 may utilize this information to determine a shape, a size, and/or a location of a user's finger (or fingers) on display 120. In one exemplary implementation, processor 20 may calculate touch area(s) associated with a user's finger(s) based on information received from sensing layer 320, and may reconfigure display element(s) (e.g., keys, icons, etc.) associated with display 120 based on the calculated touch area(s).

Although FIGS. 2 and 3 show exemplary components of display 120, in other implementations, display 120 may contain fewer, different, differently arranged, or additional components than depicted in FIGS. 2 and 3. In still other implementations, one or more components of display 120 may perform one or more other tasks described as being performed by one or more other components of display 120.

According the principles of the invention, the sensing layer 320, which includes touch-sensitive elements, is larger than the screen 310 of display 120, and the processor 20 can determine a shape, a size, and/or a location of a user's finger (or fingers) on the sensing layer 320 outside of the screen 310. In effect, a first portion of the touch-sensitive elements is arranged inside the screen 310 (overlapping with the screen 310) and a second portion of the touch-sensitive elements is arranged outside the screen 310 (not overlapping with the screen 310). If a virtual key falls on the first portion of the touch-sensitive elements, the virtual key is completely visible. If the virtual key falls on the second portion of the touch-sensitive elements, the virtual key is invisible. If a portion of the virtual key falls on the first portion of the touch-sensitive elements and remaining portion falls on the second portion of the touch-sensitive elements, only the portion of the virtual key falls on the first portion of the touch-sensitive elements is visible. The remaining portion is invisible and is visualized by a user as in the portion of the second portion of the touch-sensitive elements if the screen 310 is extended to cover that portion of the second portion of the touch-sensitive elements. In the case that the entire virtual key completely falls on the second portion of the touch-sensitive elements and thus invisible, the imaginary position of the invisible key can be inferred from its relationship with a second virtual key. For example, if the invisible key is one centimeter below the second virtual, the invisible key would still be one centimeter below the second virtual key even if the first virtual key is not visible. The processor 20 in displaying the virtual keys performs the same extrapolation, so that the processor 20 can detect that an invisible key has been hit. Each virtual key may be assigned a function and when the virtual key is hit (touch and release), the processor 20 performs that function. For example, the function may be entering a character to an entry field, such as a text field, or text file, going to a next page, or any function of a key in a conventional keyboard.

When a virtual key is partially visible, a hit on a portion of either or both of the visible and invisible portions causes the processor 20 to perform the assigned function of that virtual key. When a virtual key is fully visible, a user must hit on a portion of the visible key and if a virtual key is fully invisible, a user must hit the corresponding location on the second portion of the touch-sensitive elements in order to cause the processor 20 to perform the assigned function of the virtual key.

The virtual keys may be part of a virtual keyboard and some keys, such as the space bar, of the virtual keyboard can be partially or completely located in the second portion of the touch-sensitive elements. In effect, those keys are not visible. Large keys, such as the spacebar would be found easily when below the screen 310 (at the usual position), even if they are invisible. It should be noted that an invisible key can also be adapted using methods described later herein.

Figure 4:
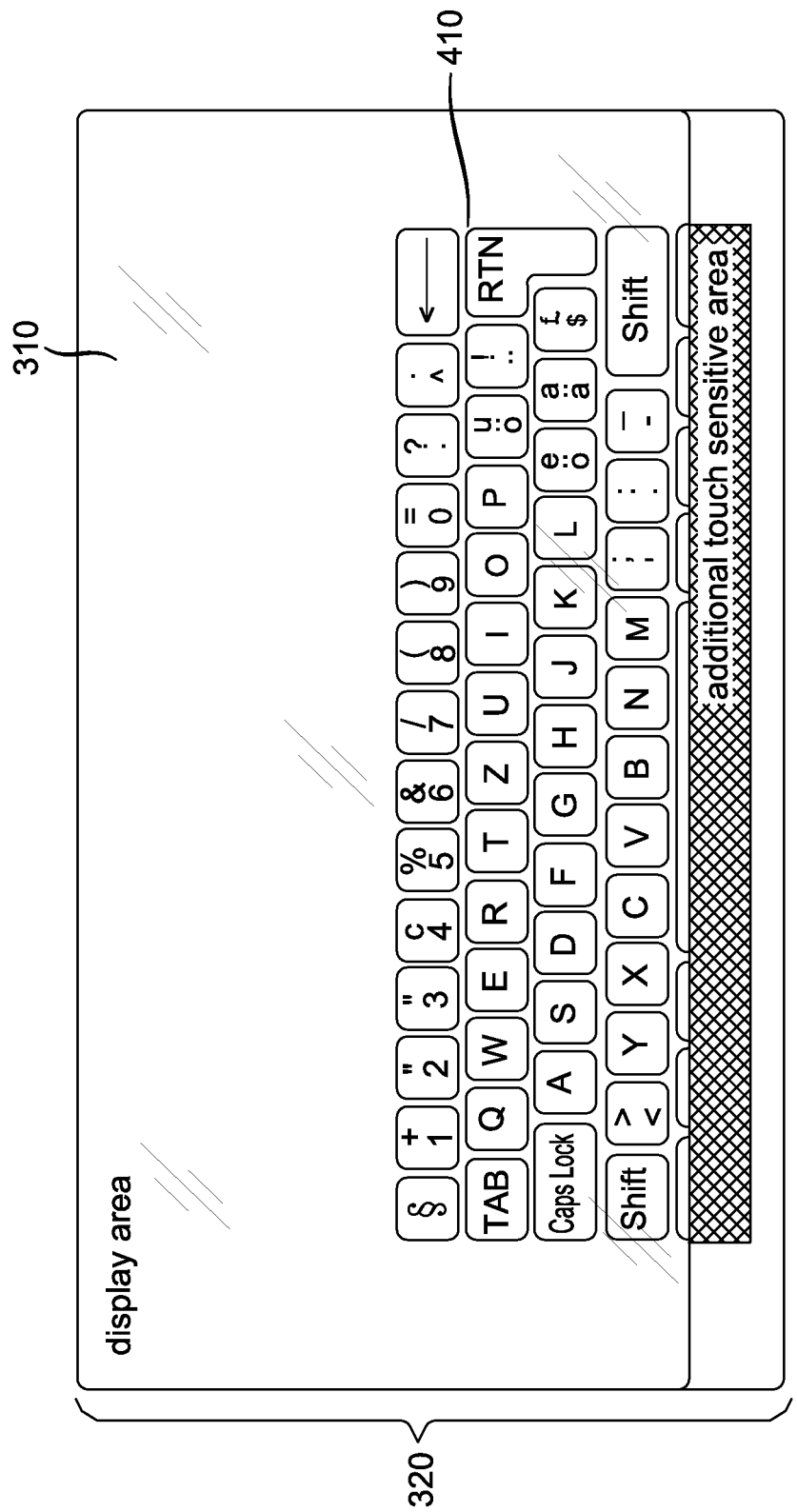
FIG. 4 shows an exemplary virtual keyboard in which some keys are partially visible but still can be activated by touching the invisible parts.

FIG. 4 shows an exemplary virtual keyboard 410 on the display 120, in which the sensing layer 320 having touch-sensitive elements extends beyond the area of the screen 310. The second portion of touch-sensitive elements is arranged to be consecutive to the bottom edge of the screen 310 and to the first portion of the touch-sensitive elements. In this example, the spacebar and its horizontal neighbors are only displayed partially (upper portion on the screen 310 and on the first portion of the touch-sensitive elements, lower portion outside of the screen 310 and on the second portion of the touch-sensitive elements) such that their positions are easier to find visually. The second portion of the touch-sensitive elements may exist in any of all sides of the screen 310. For example, if the virtual keyboard 410 is moved to the top, the row of the number keys can be partially displayed. Similarly, the keys on the right or left side can be partially displayed if touch-sensitive area is also extended in that side.

It is noted that the processor 20 can move the keyboard 410 anywhere in the screen 310 in response to a user input. For example, a user can drag the keyboard 410 to any position on the screen 310. However, if an invisible key falls outside of the area for the touch-sensitive elements, a user will not be able to activate the assigned function of that invisible key even if the user hits that invisible key because the hit is not detectable by the processor 20.

Figure 5:
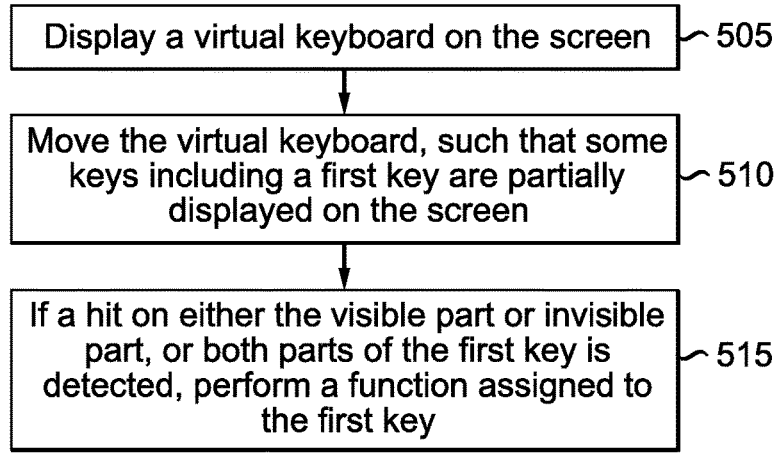
FIG. 5 shows an exemplary process of using the exemplary keyboard shown in FIG. 4.

FIG. 5 shows an exemplary process 500 of using the exemplary keyboard 410. For purposes of example and explanation only, the steps of FIG. 5 may be explained hereinafter with specific reference to the exemplary embodiments of FIGS. 1, 2, 3 and 4 described above. At step 505, the processor 20 displays a virtual keyboard, wherein the entire virtual keyboard is displayed on the screen 310 and falls on the first portion of the touch-sensitive elements in response to a user input. Illustratively, the virtual keyboard is displayed when a user turned on the PCD 1, or when the processor 20 detects that a user taps the display 20 a predetermined number of times, for example twice.

At step 510, the processor 20 moves the virtual keyboard 410, in response to a user input, to a position in which some keys including a first key of the keyboard are partially displayed on the screen 310 and are visible. The visible portions of those partially displayed keys fall on the first portion of the touch-sensitive elements and the invisible portions of those partially displayed keys fall on the second portion of the touch-sensitive elements. An example of the moved keyboard is shown in FIG. 4. In this example, the first key is the space bar, and the visible portion of the first key falls on the first portion of the first portion of the touch-sensitive elements and the invisible portion falls on the first portion of the second portion of the touch-sensitive elements.

The exemplary keyboard includes a plurality of rows, and those partially displayed keys are arranged in one of the rows. In this example, the partially displayed keys are located in the row that includes the space bar key as shown in FIG. 4. Although illustrated as rectangle in shape, the keyboard can have a different shape. For example, the keyboard and one of more of its rows can be askew, flexed, of radial shape or scattered.

When the processor 20 detects that the first key has been hit, the processor 20 enters a space into an entry field, such as a text field, or a text file at step 515 because the assigned function of a space key is to enter a space. The first hit can be on the first portion of the first portion of the touch-sensitive elements only, on the first portion of the second portion of the touch-sensitive elements only, or on both.

The processor 20 may further move the keyboard to a position in which those partially visible keys become completely invisible and fall on the second portion of the touch sensitive elements, in response to another user input. In the newly moved keyboard, the first key is invisible and falls on a second portion of the second portion of the touch-sensitive elements and when the processor 20 detects a hit on the second portion of the second portion of the touch-sensitive elements, the processor 20 enters a space into the entry field, such as a text field, or the text file.

Figure 6:
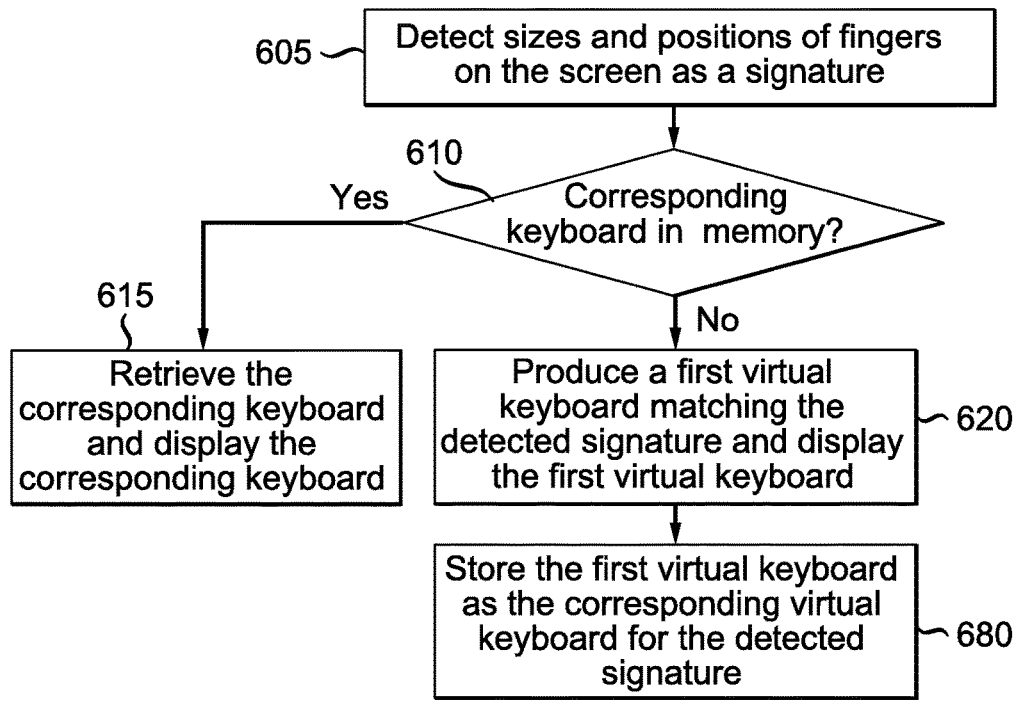
FIG. 6 shows an exemplary process of dynamically adapting a virtual keyboard to match the signature representing a user.

According to the principles of another invention, a virtual keyboard can be adapted to fit the width of the user's hands and fingers. FIG. 6 illustrates a process 600 of dynamically adapting a virtual keyboard. For purposes of example and explanation only, the steps of FIG. 6 may be explained hereinafter with specific reference to the exemplary embodiments of FIGS. 1-3 described above and other figures described later.

At step 605, the processor 20 detects sizes and positions of touches as a signature on the screen 310 representing fingers of a user. In one embodiment, a user places all ten fingers on the screen 310 without display of a default keyboard, allowing the processor 20 to build and present a matching layout of the displayed virtual keyboard according to the sizes and spreads of the fingers. The relative positions and sizes of the ten fingers are recorded by the processor 20 as a signature for future reference. The keys produced by the processor 20 do not have to be arranged strictly in an "in-line orientation". For example the fingers of a hand can be placed in a slight, natural bow or angle and the hands can be in a more ergonomic position not necessarily strictly side-by-side.

In another embodiment, since both thumbs handle only the space bar, it would be sufficient to place only one of the thumbs and therefore 9 fingers on the touch screen for the processor 20 to determine the size and shape of the virtual keyboard. Further, based on the spaces between the fingers other than the thumb(s), the position of the space bar can be evaluated even if no thumb is detected by the processor 20.

Figure 7:
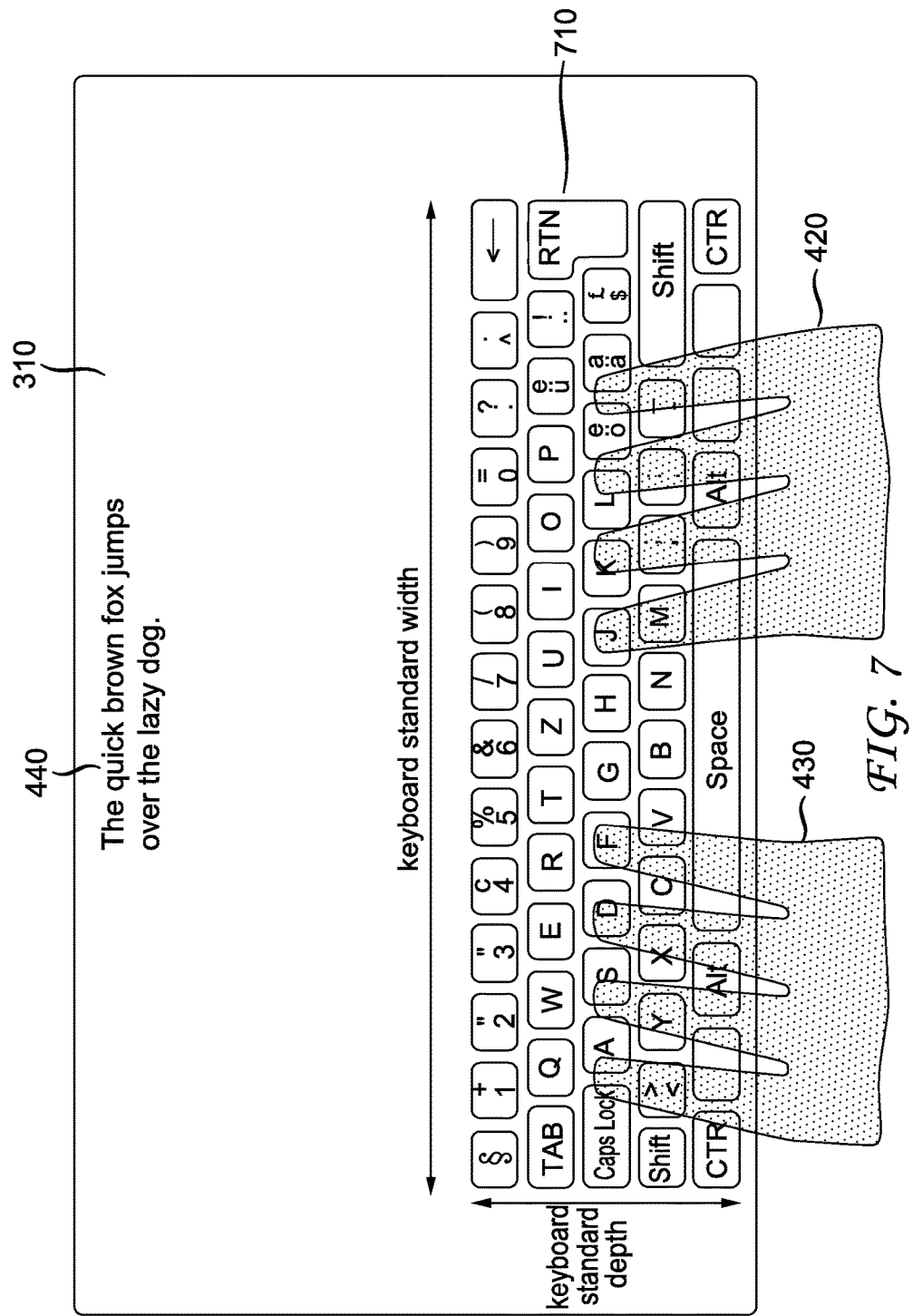
FIG. 7 shows an exemplary virtual keyboard before being adapted to match the signature representing a user.

In yet another embodiment, a default keyboard, for example, the exemplary conventional European keyboard shown on FIG. 7 is displayed on the screen 310. Illustratively, the virtual keyboard 710 is displayed when a user turned on the PCD 1, or when the processor 20 detects that a user taps the screen 310 a predetermined number of times, for example twice. A user then naturally and comfortably places the pinkie, ring, middle, and index fingers on the left hand 430 on 'A', 'S', 'D', and 'F' keys, respectively, and the pinkie, ring, middle, and index keys of the right hand 420 on the "ó/é", 'L', 'K', and 'J' keys, respectively. However, the user needs only aligning the index finger of the right hand 420 with the 'J' key or the index finger of the left hand 430 with the 'F' key. If neither index finger is aligned with the respective key, the processor 20 should warn the user to adjust the positions. Since the fingers are placed naturally, the other three fingers of each hand may not be aligned with the corresponding three keys. The relative positions and sizes of the fingers are stored as the signature of the user.

The use of eight, nine, or ten fingers as a signature is exemplary. Using four or more fingers with at least one finger aligning to a particular key may be sufficient if a virtual keyboard is displayed by the processor 20.

In yet another embodiment, the processor 20 stores user identification, such as a login name, in addition to the corresponding virtual keyboard and a signature. In this embodiment, the processor 20, in response to a user signal for initialization, displays a default virtual keyboard and a login field, so that the user can use the default virtual keyboard to enter the user identification in the login field. Once the processor 20 has received the user identification, the processor 20 can find whether there is a corresponding signature and hence the corresponding virtual keyboard in the memory 30.

In addition to entering the login name, a user may be required to enter a password as well. Other identification of a user may include anything biometrical that uniquely identifies a user, and any combination of a password, a key, and biometrical identifier.

At step 610, the processor 20 checks whether there is a corresponding virtual keyboard associated with the detected signature in the memory 30. If the corresponding virtual keyboard exists in the memory 30, the processor 20 at step 615 retrieves the corresponding virtual keyboard from the memory 30 and displays the corresponding virtual keyboard on the screen 310. This corresponding virtual keyboard should be an adapted keyboard produced previously with respect to this particular signature. If the default virtual keyboard 710 is displayed, the default virtual keyboard 710 is replaced by the corresponding virtual keyboard. Text 440 in FIG. 7 is entered by a user through the use of the adapted virtual key board.

If no corresponding virtual keyboard exists in the memory 30, the processor 20 at step 620 produces a first virtual keyboard matching the detected signature and displays the first virtual keyboard, so that the user can start using the keyboard to enter data. In effect, the first virtual keyboard is an adapted virtual keyboard that matches the detected signature, i.e., the relative positions and sizes of those fingers detected. The processor at step 680 then stores the adapted keyboard in the memory 30 as corresponding to the detected signature.

As stated above, if the corresponding virtual keyboard does not exist, the processor 20 produces a first virtual keyboard matching the detected signature, so that a hit to a key from the user more likely produces a hit having its geometric center matching the geometric center of that key, and thus reducing the possibility of a mishit.

Figure 8:
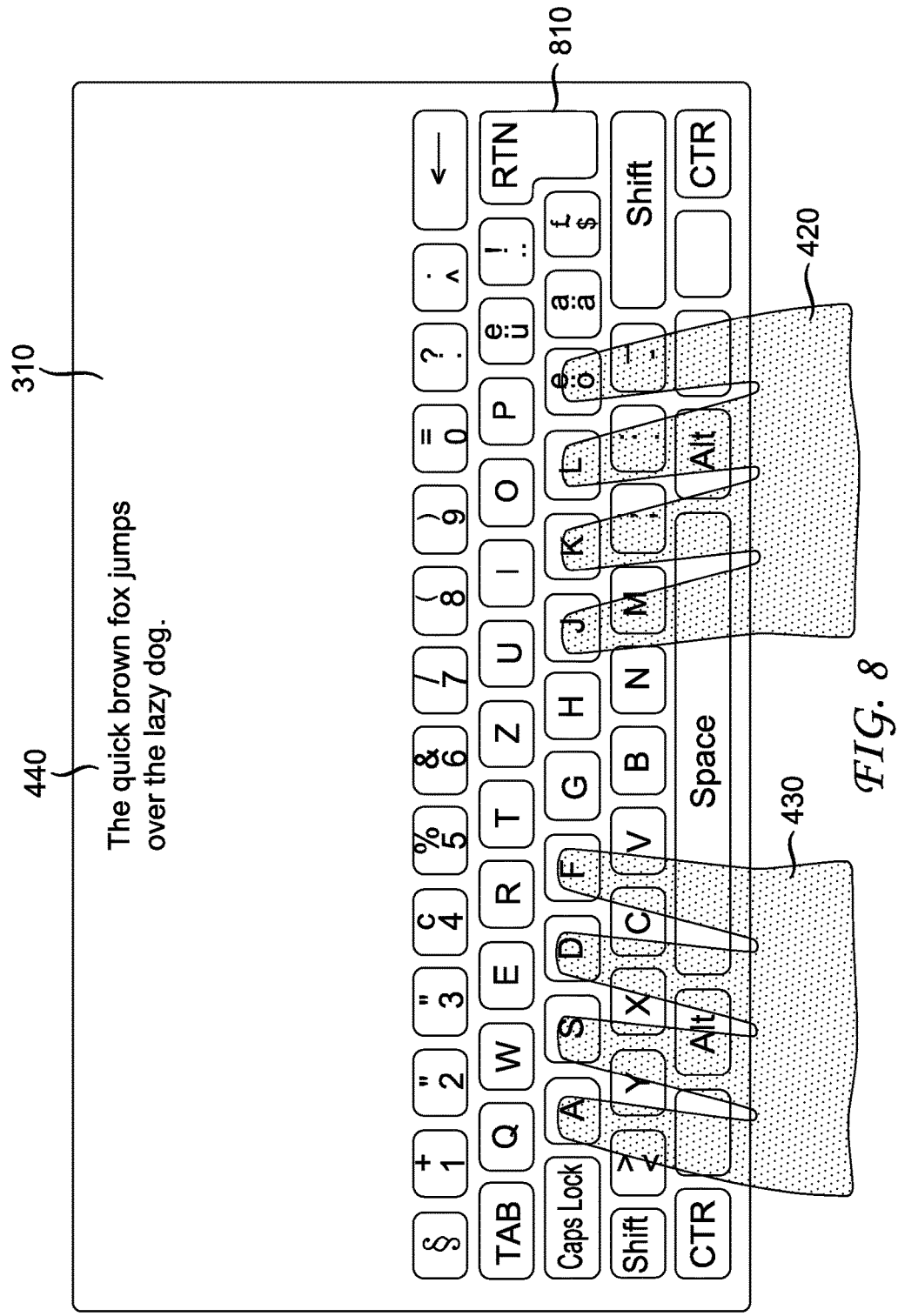
FIG. 8 shows the virtual keyboard shown in FIG. 7 has been adapted according to a signature representing user with bigger hands.
Figure 9:
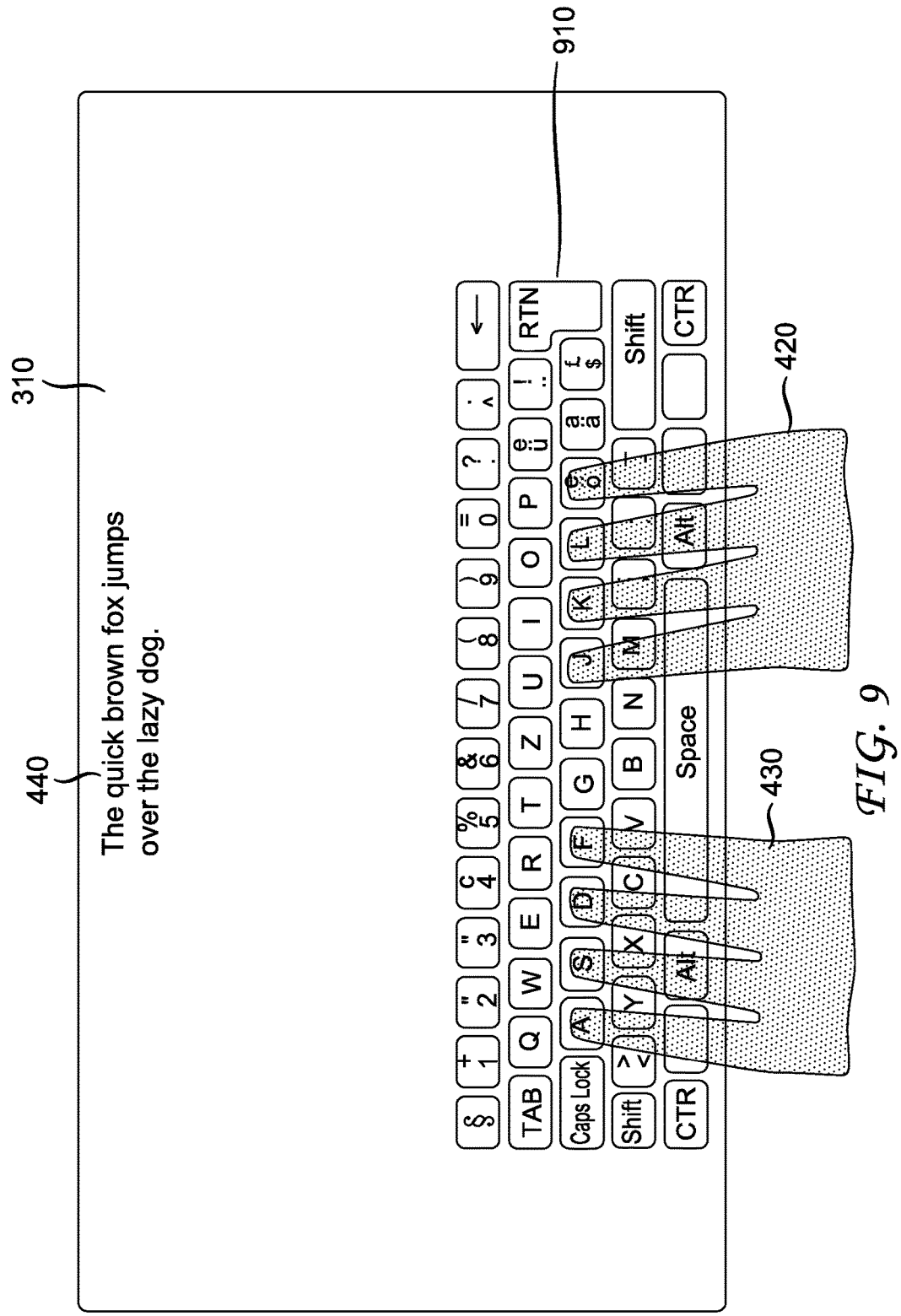
FIG. 9 shows the virtual keyboard shown in FIG. 7 has been adapted according to a signature representing user with smaller hands.

For example, if a default virtual keyboard, such as the default virtual keyboard 710 in FIG. 7, is displayed, the processor 20 adjusts the default virtual keyboard 710 to a wider and larger virtual keyboard 810 as the first virtual keyboard, as shown in FIG. 8 for bigger hands. For smaller hands, the processor 20 may shorten the virtual keyboard 710 to a narrower and smaller virtual keyboard 910, as shown in FIG. 9. In effect, the processor 20 adapts the default virtual keyboard 710 to produce the first virtual keyboard.

As compared to the virtual keyboard 710, the width of each key in the virtual keyboard 810 is larger and the width of each key in the virtual keyboard 910 is smaller. The processor 20 may also automatically change the depth of a key proportional to the change in width (aspect ratio of a key remain the same) of that key.

Figure 10:
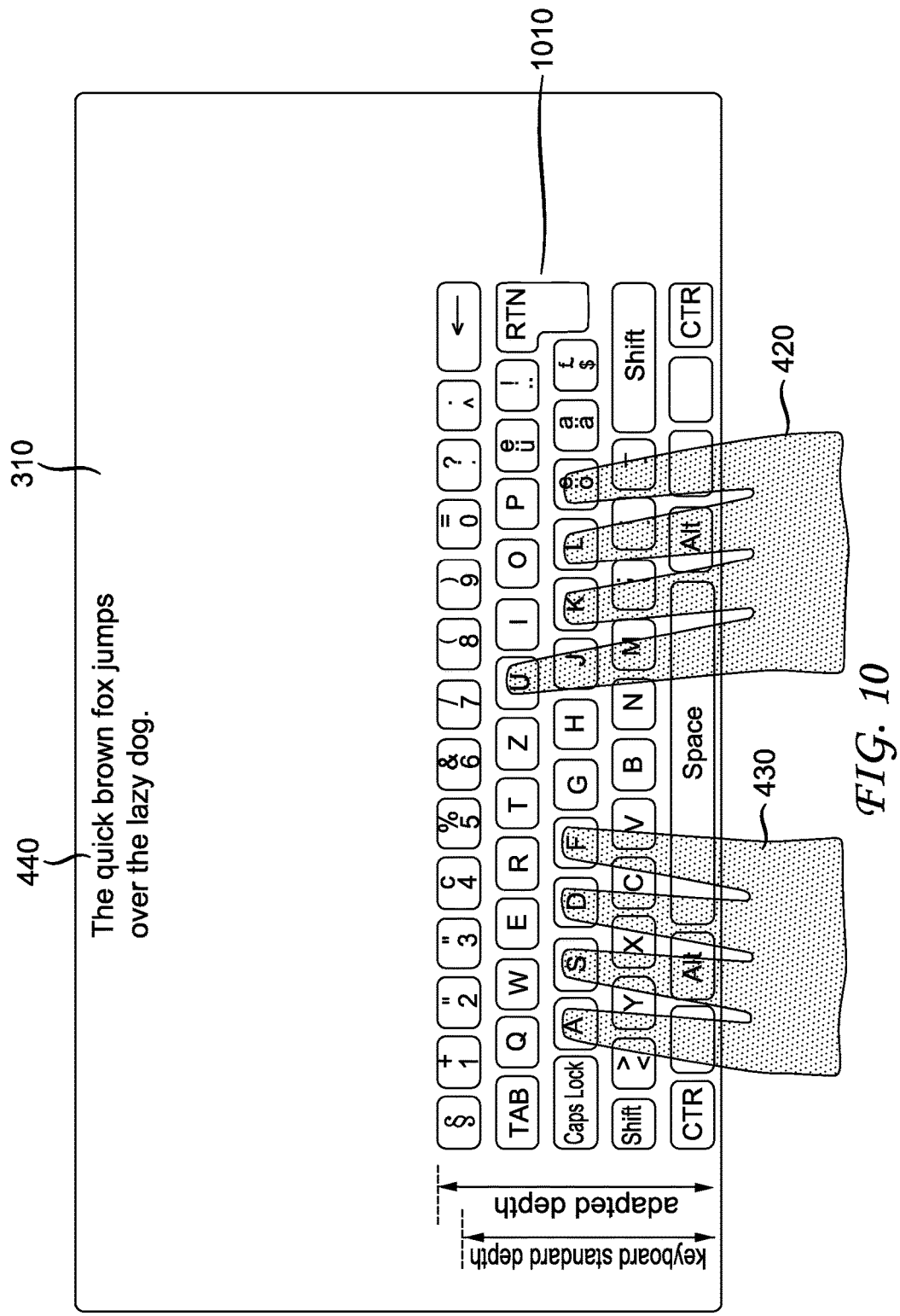
FIG. 10 shows an exemplary gesture to increase depth of keys in a virtual keyboard.

As an alternative, the processor 20 does not adjust the depth automatically but as instructed by the user. To manually adjust the depth, a user may place at least one finger, for example, the index finger of the right hand 420, on a virtual key, for example, the 'U' key, in an upper row, while maintaining the positions of the other seven fingers, as shown in FIG. 10, and in response, the processor 20 increases the depth of each key. If the index finger is placed in a lower row, the processor 20 decreases the depth of each key. The width of a key depends on the size of the finger (larger fingers will need a wider keyboard) but the depth of a key depends on the length of the top segment of a finger but also depends on the habit of the user. For example, if a user uses finger tips most of the time, the depth of a key can be smaller. The processor 20 may store the manually adjusted keyboard, when the user releases all the fingers from the screen 310 signaling that the initialization process has been completed.

In another embodiment, when the user spreads the fingers (more distance between fingers), the processor 20 proportionally increases the depth of the virtual keyboard and when the user closes the fingers (opposite of spreading) the processor 20 decrease the depth of the keyboard. When the user sees that the depth is appropriate, the user stops moving the finger and the processor 20 stops changing the depth.

As mentioned earlier, a user can drag a virtual keyboard to any position in the screen 310. This feature is advantageous particularly on larger screens when the keyboard covers part of the application or a "window" (that might arise during the use or by user input). In this situation, the user can quickly move the keyboard to a new position almost without interrupting the typing. If the user moves the keyboard over the edge of the touch screen and beyond the touch-sensitive area, the process or 20 may warn the user aurally or visually. In response, the user may shrink the virtual keyboard to keep the virtual keyboard within the touch screen or touch-sensitive area. The user may also ignore the warning and continue to move the keyboard beyond the touch screen edge till finally the virtual keyboard disappears.

In another embodiment, which is more suitable for the "hunt and peck" users, a user places as few fingers as possible, for example, the two index fingers, on the screen 310 for initial set-up by the processor 20. However, since the other fingers and the thumbs are not present, the processor 20 produces only "in-line orientated" virtual keyboard. The distance between the index fingers can be used by the processor 20 as a reference for evaluating the size and position of the keys.

After the initiation process, the processor 20 can dynamically adjust/adapt the layout/size/position of keys in the displayed keyboard during a user editing session or training session according to the principles of the invention. In one embodiment, the user can place the fingers used for initiation of the keyboard again on the touch screen and move, spread/narrow or rotate the fingers/hand to adjust the keyboard. The processor 20 detects the multi-finger gesture and the finger movement (sliding in the screen plane) to trim the size and position of each virtual key. This slight finger movement would define a region on the screen slightly larger than a fingertip to be the respective virtual key.

During the use of the first virtual keyboard, the processor 20 may collect a hit statistics for a key, so that the processor 20 may further adjust at least one of the size, shape, and position of the key to match the typing habit of a user. A disadvantage of using a virtual keyboard is that a user never knows, whether he has hit the key in the middle, at the border or not at all. As such, hits on the same key may be on different positions. For example, the hits on the 'U' key in FIG. 11 may be centered on a position slight above and to the right of the geometric center of the 'U' key. This problem occurs more often for those keys on the far right or far left side, for example the "$ (£)" key, as shown in FIG. 12.

Figure 11:
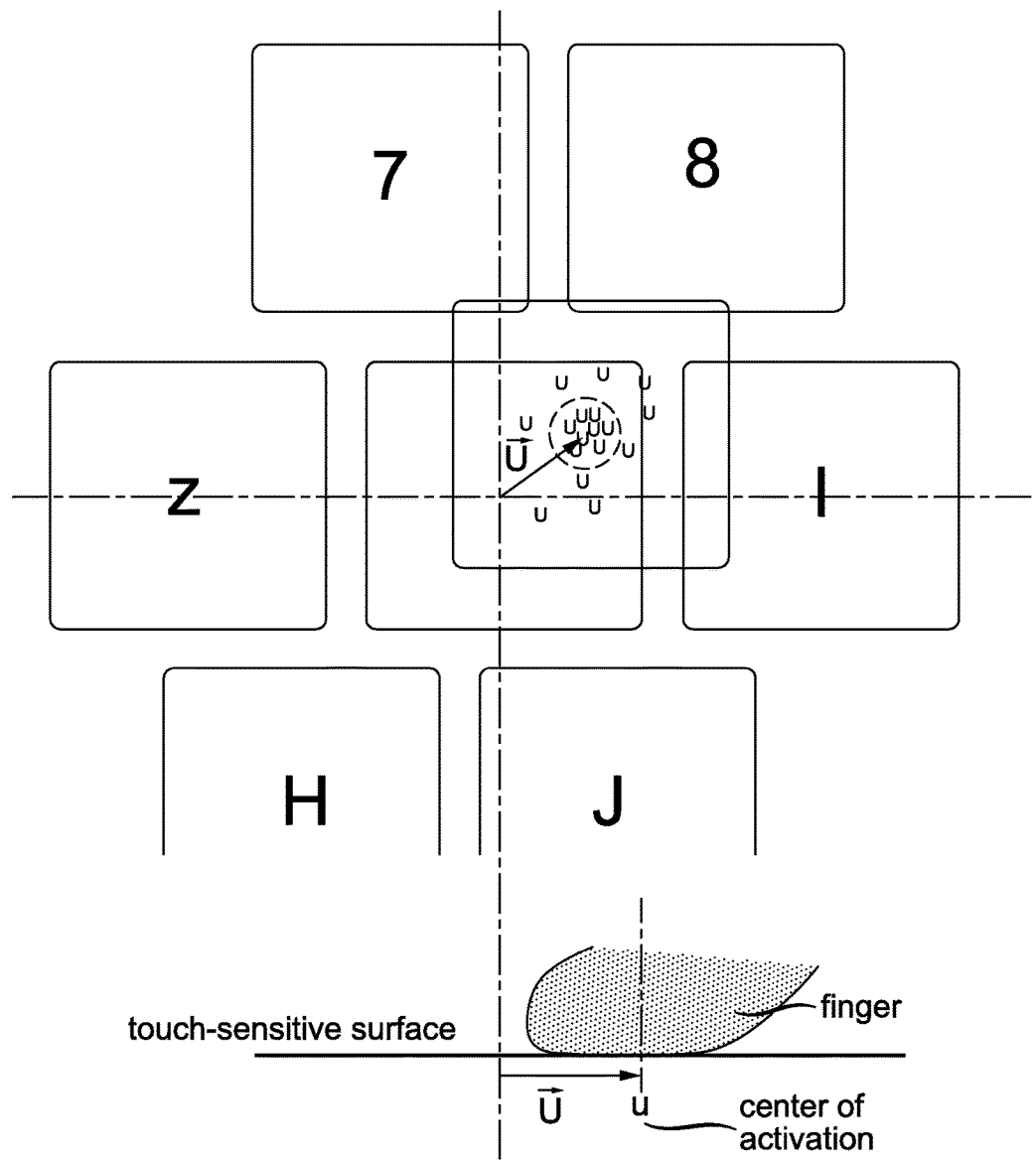
FIG. 11 shows an exemplary footprint of a key in a virtual keyboard.

The activation of a virtual key is usually triggered upon release of a hit. A hit, however, may cover an area (fingerprint) larger than the intended virtual key. To more accurately detect which virtual key is hit, the processor 20 may compute the geometric center of a fingerprint and determine that a key is hit if the geometric center of the fingerprint falls within that key. In FIG. 11, the detected centers are labelled with letter 'u'. The calculation of the centers is conventional. Other methods of matching a fingerprint with a key are well known and can be used with the principles of the invention.

The processor 20 automatically detects this variation and evaluates the region in which the keyboard should be receptive for each key. The processor 20 in effect adapts the individual keys to the user habits in respect of position, size and shape while a user hitting the keys to reduce the error rate of typing by a user on a virtual keyboard. The adaptation can take place all the time when the keyboard is in use or only during a learning phase of the system. However, the adaptation is preferably linked to a given user, so that each user has his/her personal parameter set that is loaded initially and then adjusted depending on the current setting of the adaptation. This set of parameters can be selected either by an input (user identification, signature, etc.) of a user or by recognizing the typical finger position. The user may also signal the processor 20 to store the newly adapted virtual keyboard as the corresponding virtual keyboard for the signature.

Figure 12:
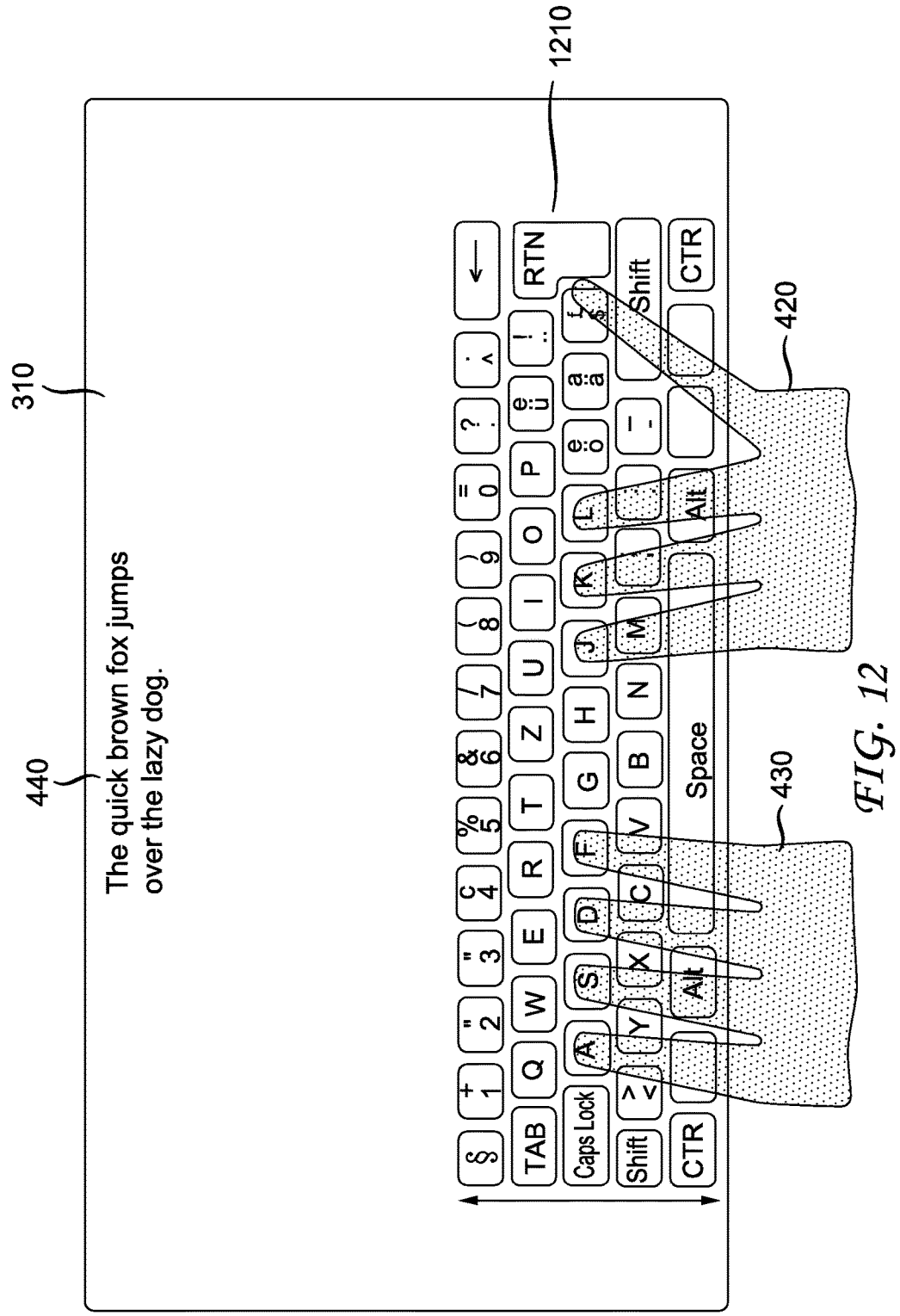
FIG. 12 shows that an example that a hit may not be centered at the intended key.
Figure 13:
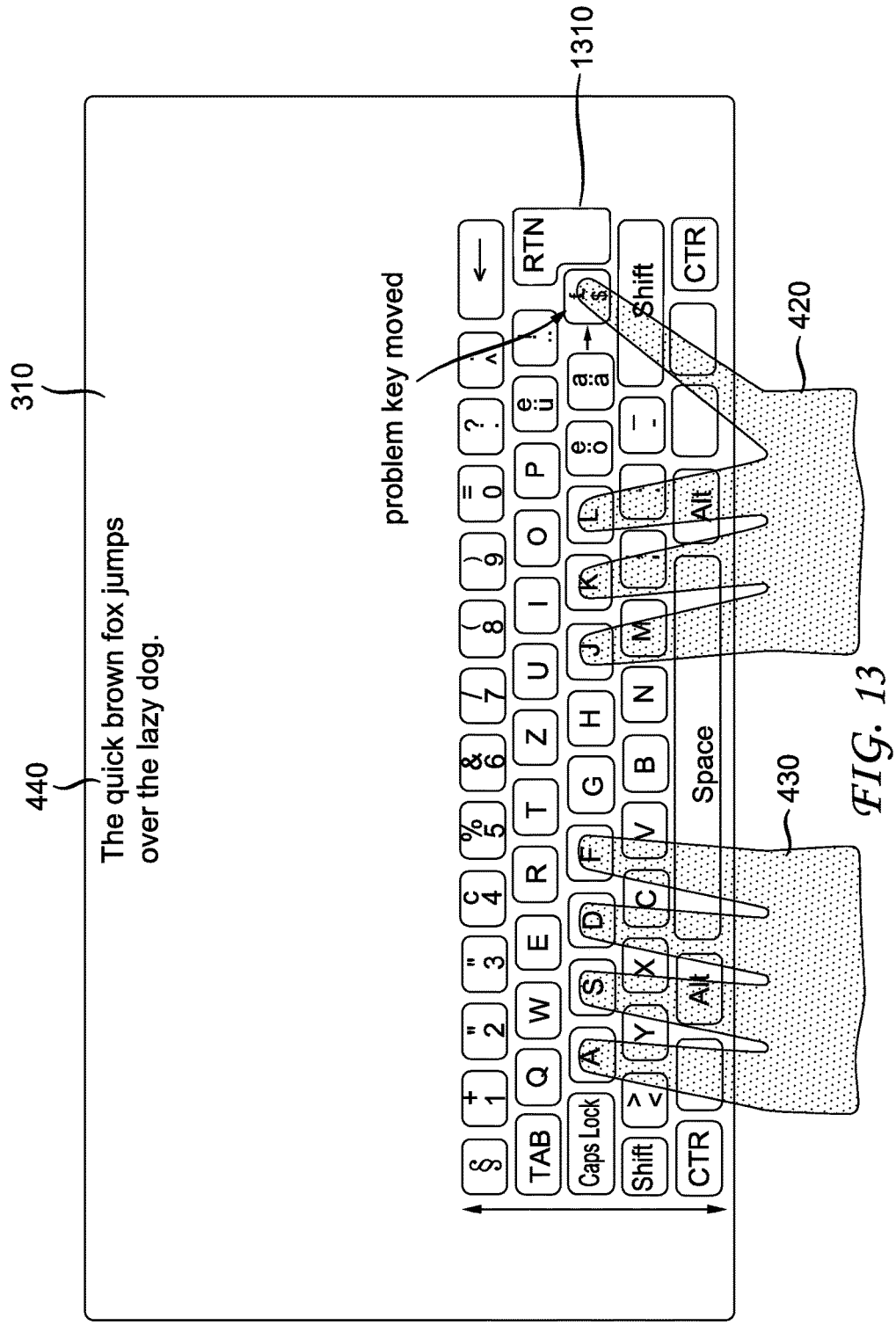
FIG. 13 shows an exemplary adapted virtual keyboard to fix the mismatch problem shown in FIG. 12.

As an example, after collecting the hit statistics for the "$ (£)" key, the processor 20 detects the mismatch between the geometric center of the "$ (£)" key and the average geometric center of the hit statistics, as shown in FIG. 12 and moves the "$ (£)" key to the right to align with the average geometric center of the hit statistics, as shown in FIG. 13. The two centers should be on the same imagined vertical line but may not match each other. In an alternative, the processor 20 can collect the hit footprint of the "$ (£)" key, and shift the geometric center of the "$ (£)" key to the geometric center of the hit footprint. A hit footprint of a key is the collection of all the touch-sensitive elements that are touched from a predetermined number of hits on that key.

Figure 14:
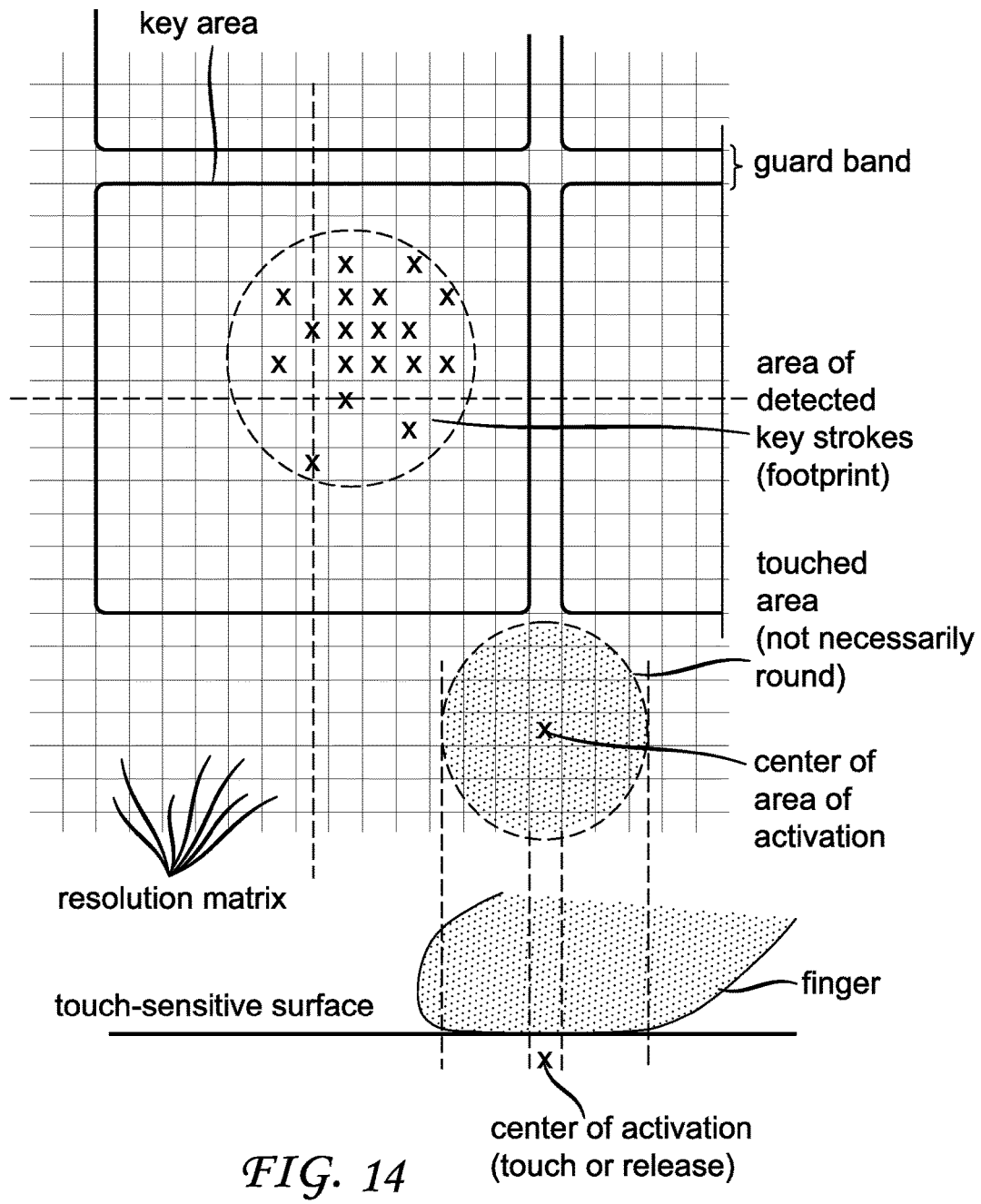
FIG. 14 shows an exemplary key in a virtual keyboard and its footprint with respect to the matrix of the touch-sensitive elements.

FIG. 14 illustrates the detected hit footprint 1220 of a key. From the footprint 1220, a geographic center can be calculated.

Figure 15:
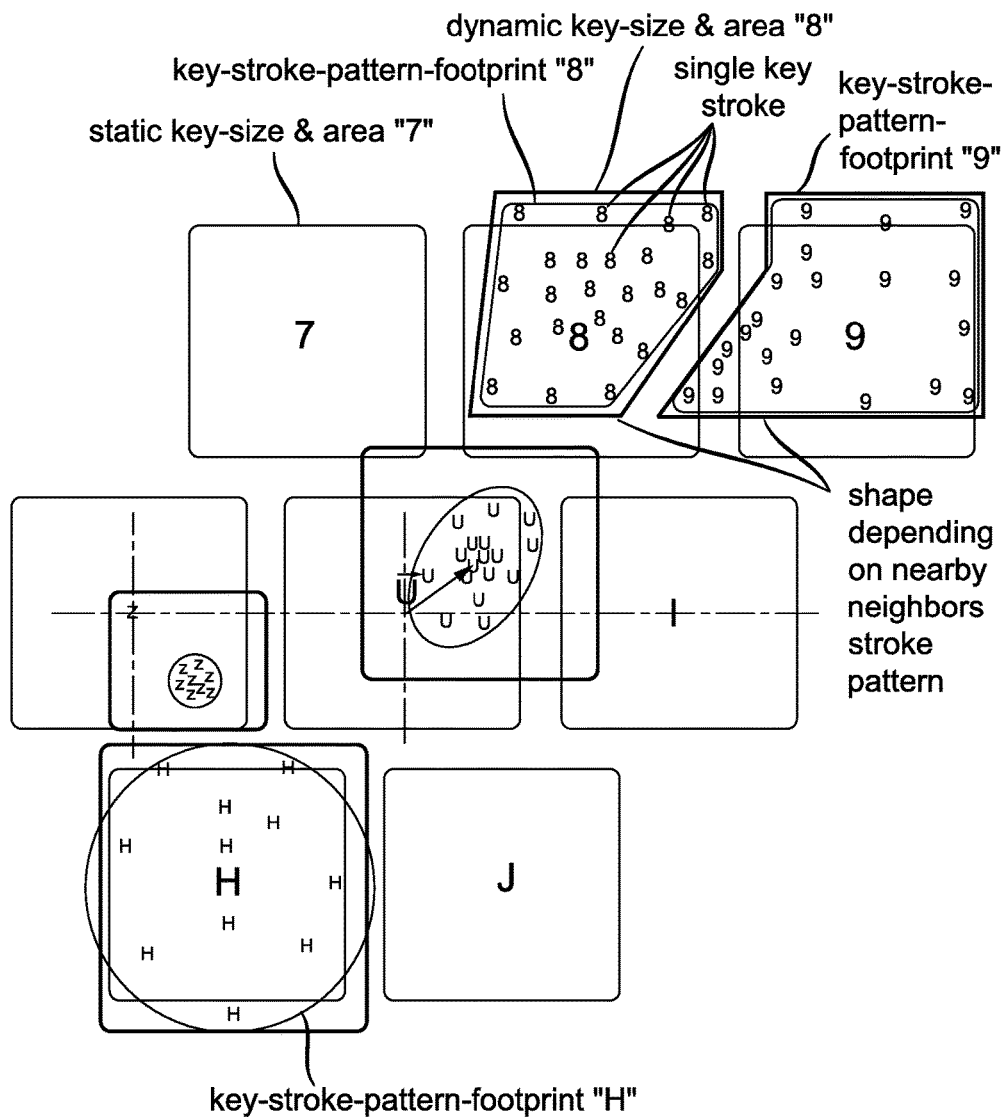
FIG. 15 shows different sizes and locations of footprints on different keys in a virtual keyboard.
Figure 16A:
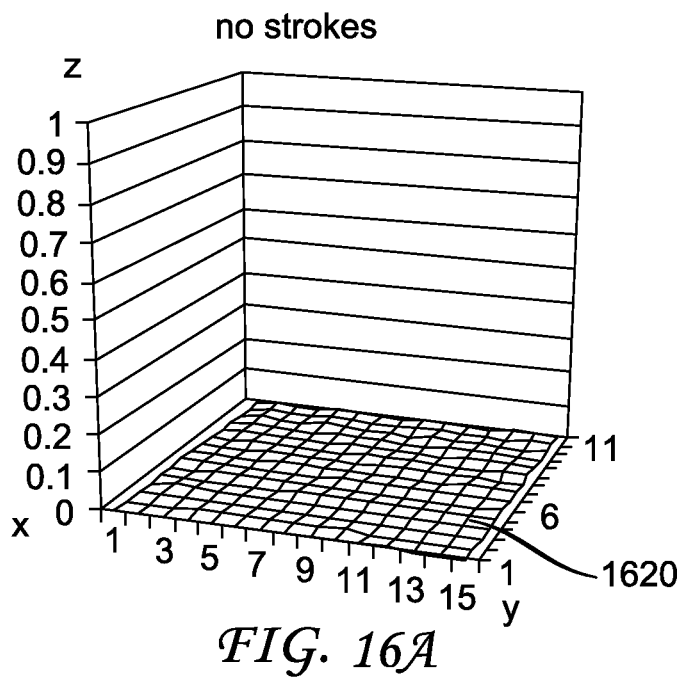
FIG. 16 shows that a key in a virtual keyboard can be dynamically adjusted based on the detected hit footprint.
Figure 16B:
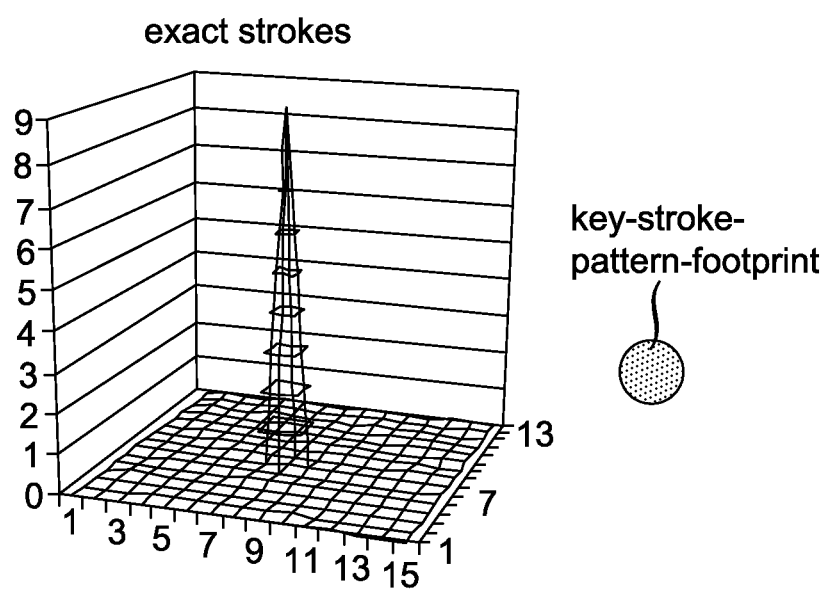
Figure 16C:
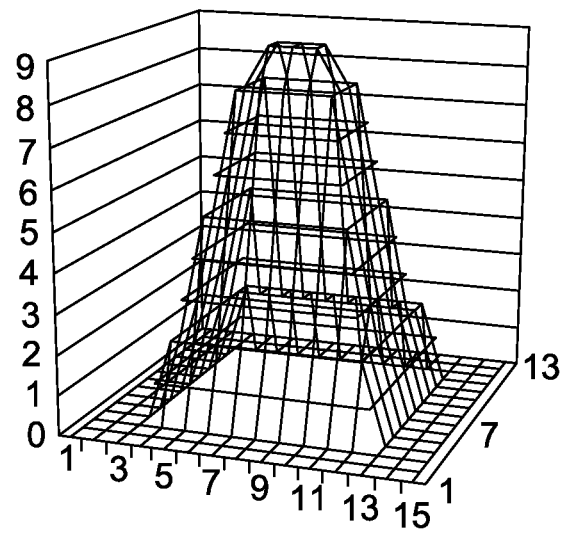
Figure 16D:
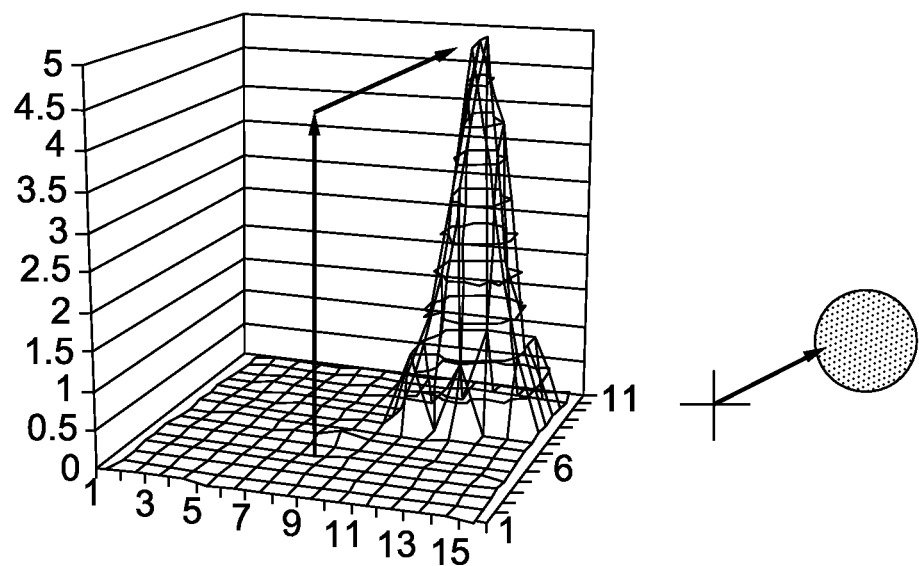
Figure 16E:
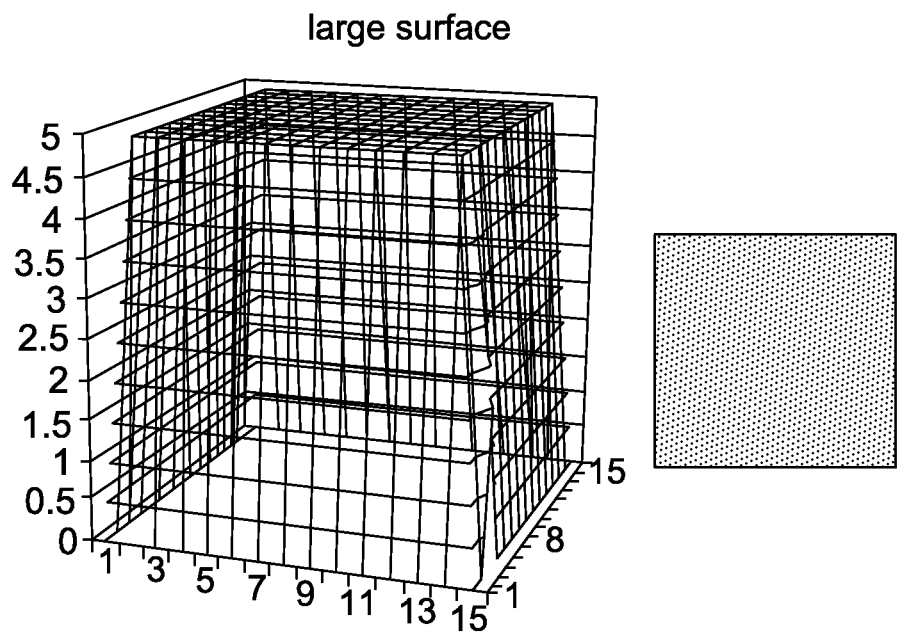
Figure 16F:
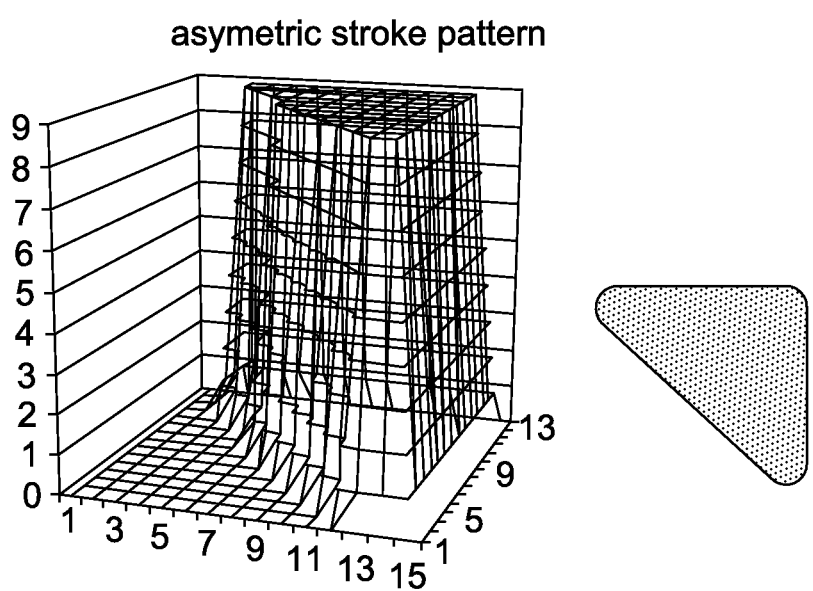

Furthermore, the user may hit some keys more consistently than others. For example, as shown in FIG. 15, the user hits the 'Z' key more consistently than the 'H', '8', '9', and 'U' keys, and the area of the hit footprint of the 'Z' key therefore is smaller than hit footprints of the others. The processor 20 can also determine from a hit footprint in FIG. 14 a shape and a size of the key 1420, so that the key 1420 becomes more suitable for the user. Illustratively, each grid includes a touch sensitive element in FIG. 14. An illustrative key 1420 covers 13×13 grids. The shape can be formed by connecting peripheral points in the hit footprint 1440. It is noted that a guard band 1430, which is the region between two keys, can be as small as the distance between two neighboring touch sensitive elements.

Although for simplicity, FIG. 14 shows that each hit activates only one touch-sensitive element, more than one touch-sensitive element is activated in practice.

According to the footprints collected, the processor 20 resizes the keys accordingly, as shown in FIG. 15. The user hits the 'Z' key more consistently and the processor 20 shrinks the 'Z' key making more room for other keys that may be enlarged. By contrast, the 'H' key is adjusted larger. The processor 20 may also change the shape of a key according to the hit footprint for that key. For example, the number '8' and '9' keys are adjusted to have a five-sided shape.

FIG. 16 illustrates that the shape and size of a key can be dynamically adjusted based on the detected hit footprint. The X and Y axes define the touch area 1620 representing a key, which illustratively is a 13×13 grid area. The Z axis indicates number of hits/strokes. FIG. 16A shows that no hit has been detected in the area 1620. FIGS. 16B and 16D show that hits are confined to smaller and larger circle areas, respectively. The smaller circle is located approximately at the geometric center of the area 1620. Thus, the size of the key may be reduced. The bigger circle in FIG. 16D, however, is not located approximately at the geometric center of the area 1620 and tilt to the top-right. Thus, the position of the key should be moved toward the top-right, such that the geometric center of the area 1620 matches the geometric center of the bigger circle. Since the size of the bigger circle is smaller than the size of the area 1620, the key can also be made smaller. FIGS. 16C and 16E show that the hits are confined to smaller and larger squares, respectively. The geometric center of the smaller square in FIG. 16C matches the geometric center of the area 1620. Two geometric centers are said to be matched if the distance between the two centers is less than a predefined number of grids, such as one grid, which may be set by a user. The key therefore needs not be moved but can be made smaller. The bigger square in FIG. 16E takes up the entire area 1620 and beyond. As such, the key should be enlarged. FIG. 16F shows that the hits are confined to a triangular area, i.e., the hit pattern is asymmetric. The area 1620 should be moved such that the two geographic centers match.

In addition to changing size and the location, the processor 20 may change the shape of a key as well. For example, the keys in FIGS. 16B and D can be reshaped to a circular, the keys in FIGS. 16 C and E can be reshaped to a rectangle, and the key in FIG. 16F can be reshaped to a triangular. As pointed out previously, a shape can be formed by connecting peripheral points in the hit footprint (the connected shape). In one embodiment, if a predefined number of shapes are used, the processor 20 may use one of the predefined shapes, which has the minimum error when enclosing the connected shape, as the adapted shape. The error can be calculated, for example, by counting the number of touch-sensitive elements (grids in FIG. 16) between an enclosing predefined shape and the connected shape.

If the deviation is too big that the desired key is not hit at all and a neighboring key may be activated, the user has to use the backspace key to delete this letter and enter the correct one—respectively a dictionary function makes a correction proposal (as it is nowadays). According to the principles of the invention, the processor 20 may detect a miss hit (stroke) and add the miss hit to the footprint of the desired key. For example, if the hit misses the desired key completely and touches a neighboring key, and the user uses the backspace key to delete this letter and enter the correct one, the processor 20 can identify the desired key and attribute the miss hit as part of the footprint for the desired key, so that the location, the size, and the shape of the desired key can be correctly adjusted.

For another example, the processor 20 may base on an automatic correction by the editing software to identify the desired key and the miss hit for more accurately detecting the footprint of the desired key. Thus, by monitoring the input and recognizing such a deleting/correcting situation, the processor 20 can use this information to influence the adaptation of the keyboard. For example, if a wrong letter is replaced multiple times with the same correction, the processor 20 can adjust the at least one of sizes, shapes, and positions of keys to reduce the rate of wrong entries. An error checking dictionary can be used for detecting miss hits and adjusting the keyboard layout continuously as well. The use of a dictionary shifts the error detection from a single letter typing error to a word based version. This means that the processor 20 can also check if the typographical is based on hitting a neighbor key or just an ordinary mistake.

Figure 17:
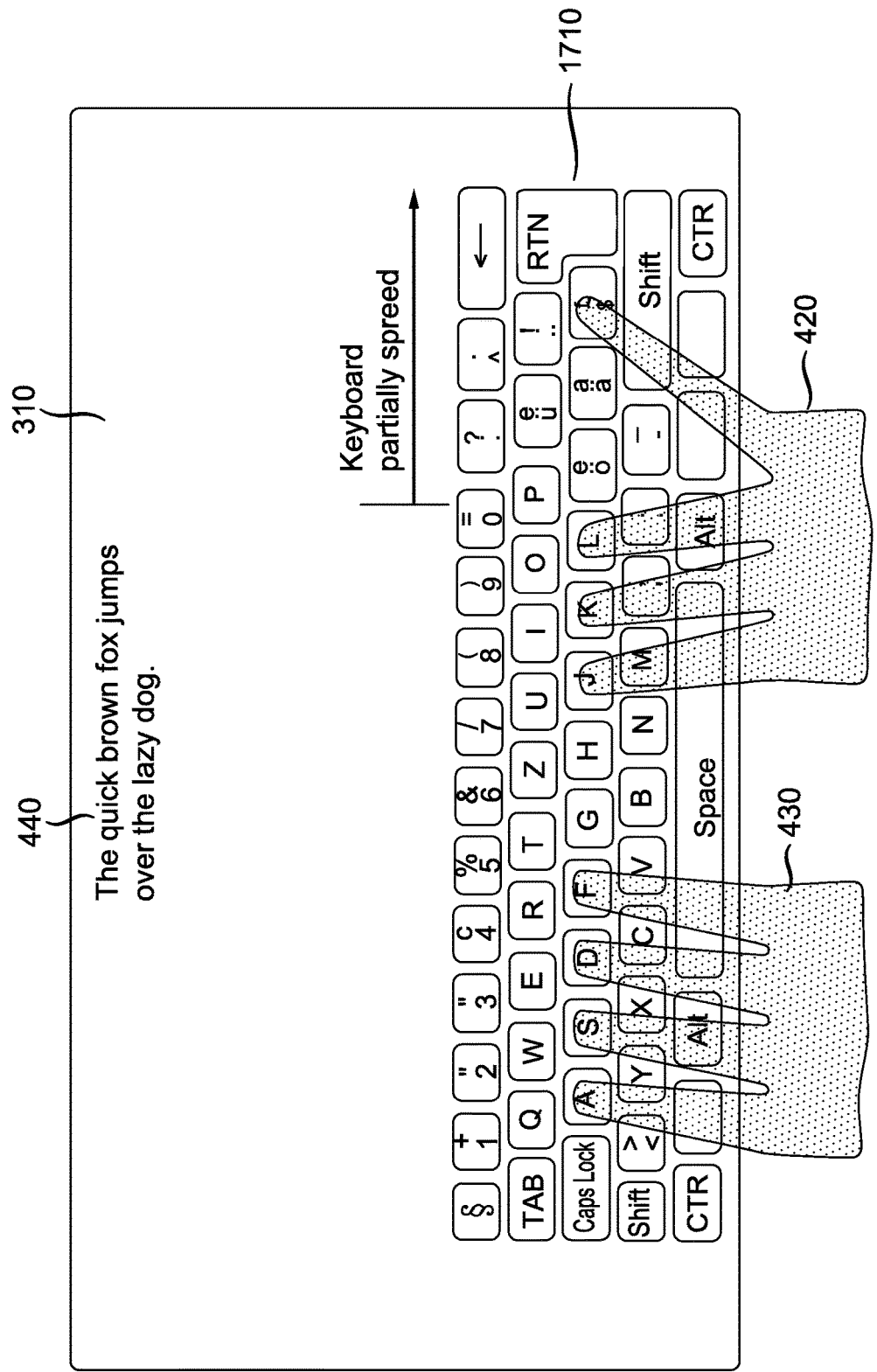
FIG. 17 shows another exemplary adapted virtual keyboard to fix the mismatch problem shown in FIG. 12.
Figure 18:
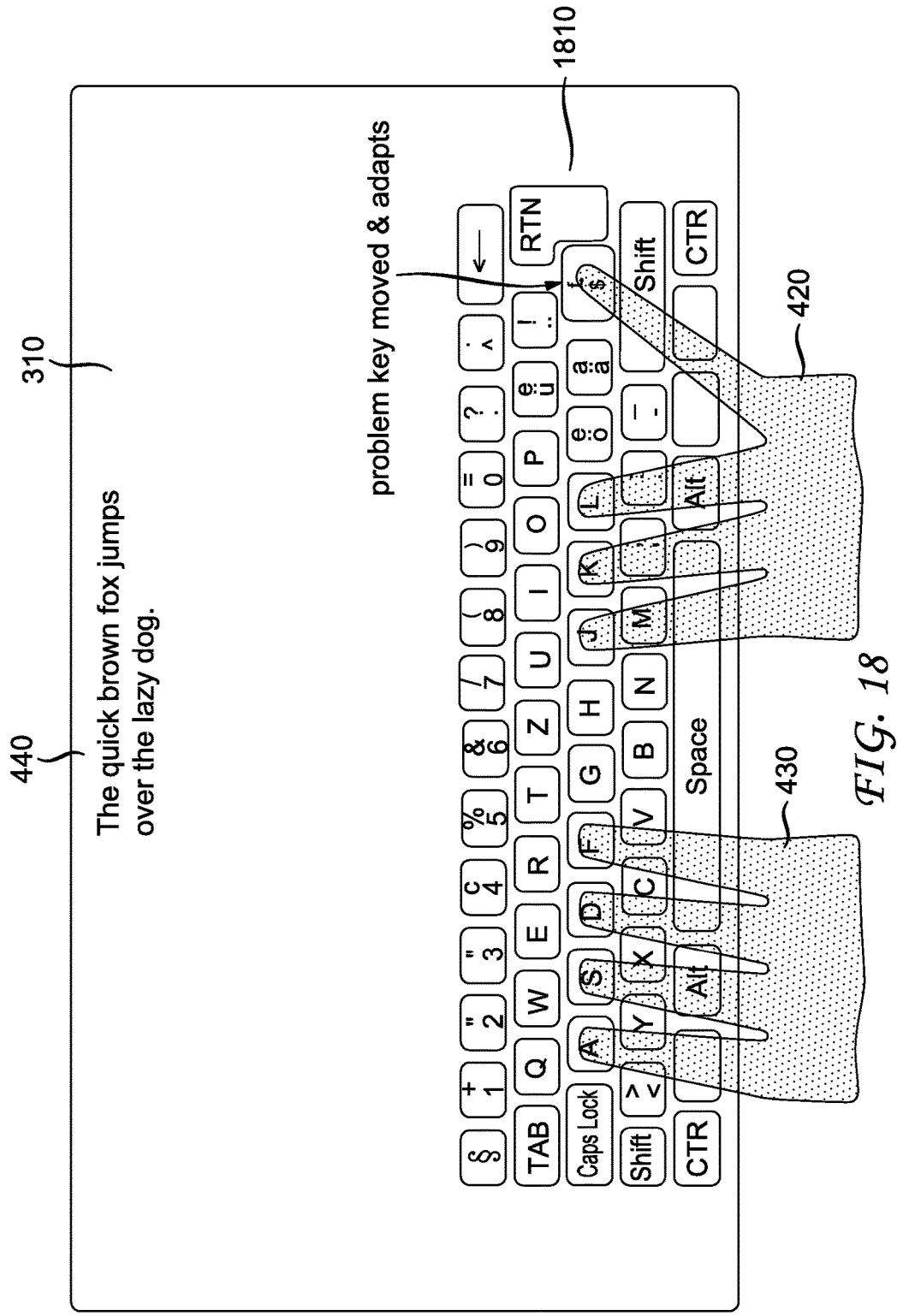
FIG. 18 shows yet another exemplary adapted virtual keyboard to fix the mismatch problem shown in FIG. 12.
Figure 19:
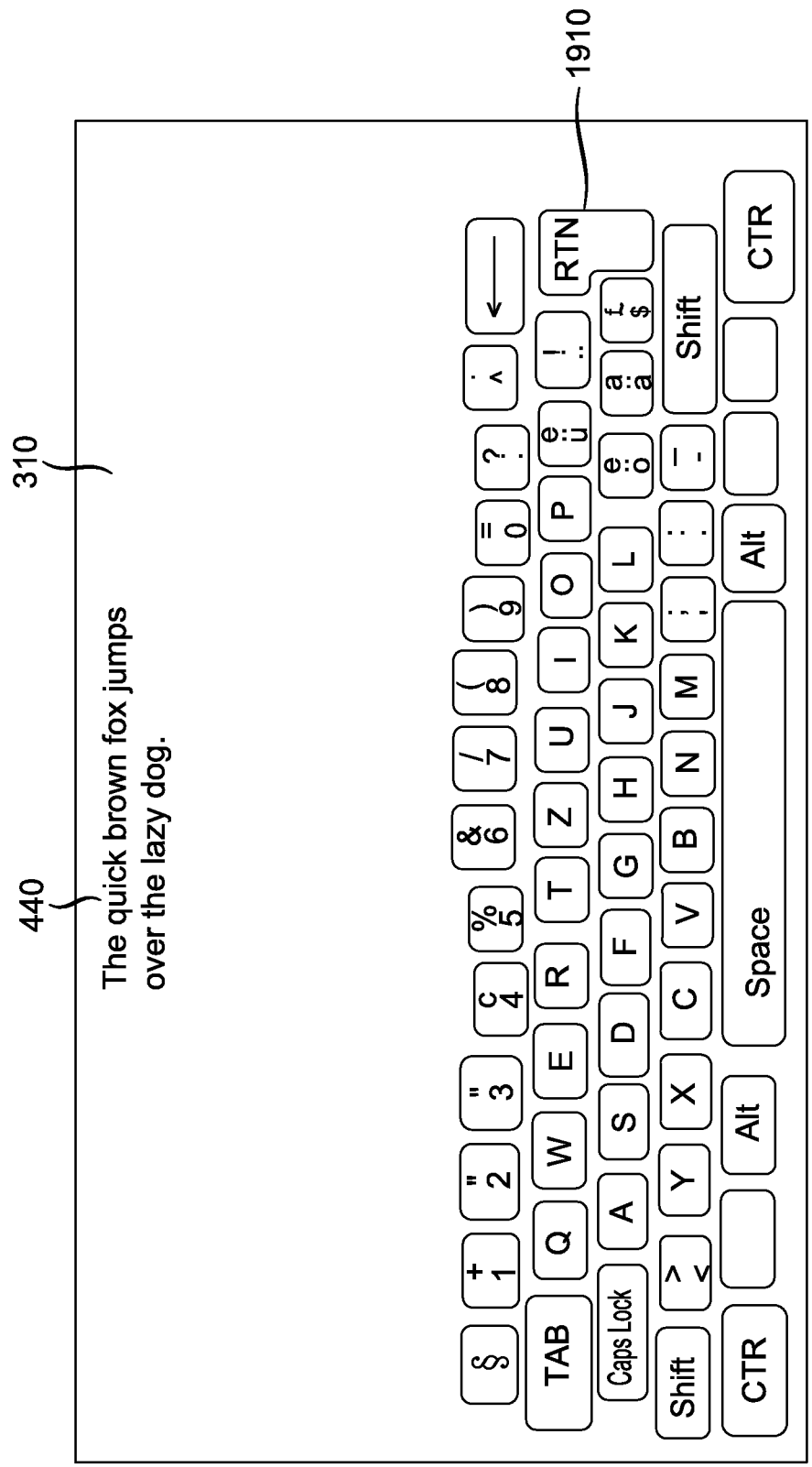
FIG. 19 shows an exemplary adapted virtual keyboard, in which the sizes of keys are not the same.

FIGS. 17 and 18 show two examples of momentary keyboard layouts. FIG. 17 shows a partially spread layout spreading only those keys that are responsible by the pinkie finger of the right hand 420, for example, from the '0' key to the right and below to fix the problem of the user straddling the pinkie finger of the right hand 420 more than expected as shown in FIG. 12. As such, the processor 20 partially spreads those keys, including number '0' key, that the pinkie finger of the right hand 420 is responsible. FIG. 18 illustrates another solution to the same problem, in which the processor 20 simply widens the "£/$" key and shrinking the 'RTN' key accordingly. FIG. 19 shows the complete layout after a learning phase with many keys changed in size and position. Notice that the keys do not have the same size.

The processor 20 may store this newly adapted keyboard as the corresponding virtual keyboard for the detected footprint automatically or in response to a user input. Since the changes are dynamic, the user may not want to save the newly adapted virtual keyboard as the corresponding virtual keyboard until the user feels that the newly adapted keyboard is satisfactory or until the user has completed the editing session.

Figure 30:
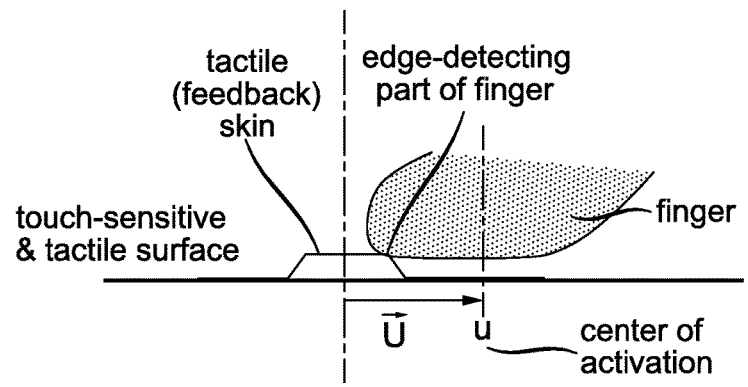
FIG. 30 shows an exemplary touch-sensitive and tactile surface that can provide tactile feedback.

According to the principle of the invention, when running such an adaptive system it may be helpful for the user to get some feedback about the systems state. It may be helpful to warn the user with an increasing sound (other feedback like light, vibration, or a tactile feedback system is possible) that the processor 20 is unable to adjust the keyboard and will initialize the keyboard to a default basic layout. The warning may start with "please type more precise" and later becomes "please reinitialize." These warning messages can be in audio or in text. The processor 20 may provide a haptical feedback, just as a response to a touch on the screen, at the same time. A tactile feedback system, in which the processor 20 rises/lowers the surface, gives the user the haptic feeling of pressing real buttons. In one embodiment, this tactile feedback system could be used to give the user a haptic feeling of touching the edge of the key. See FIG. 30 as an example. With the feedback, the user can adjust the position of a hit and hit more precisely.

Figure 20:
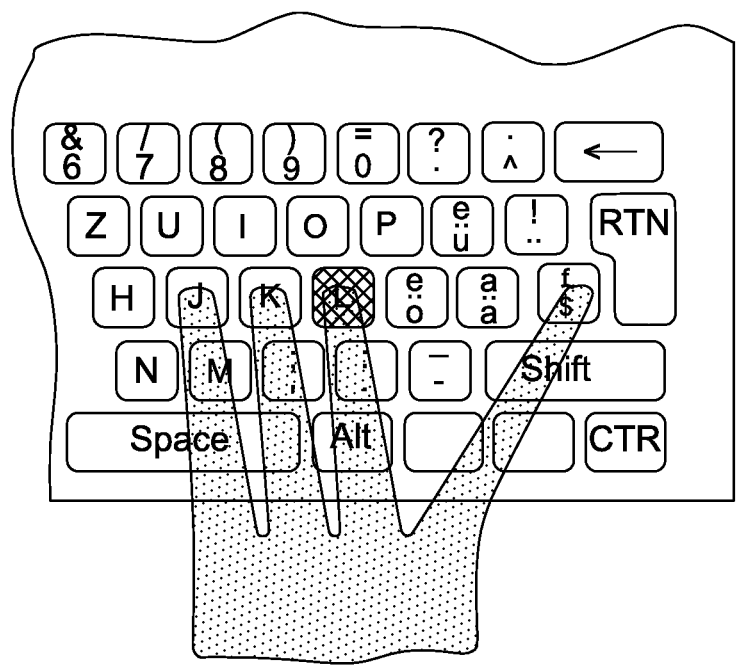
FIGS. 20 and 21 show that the location of a hit footprint of a key depends on which key was hit prior to the hit to that key.
Figure 21:
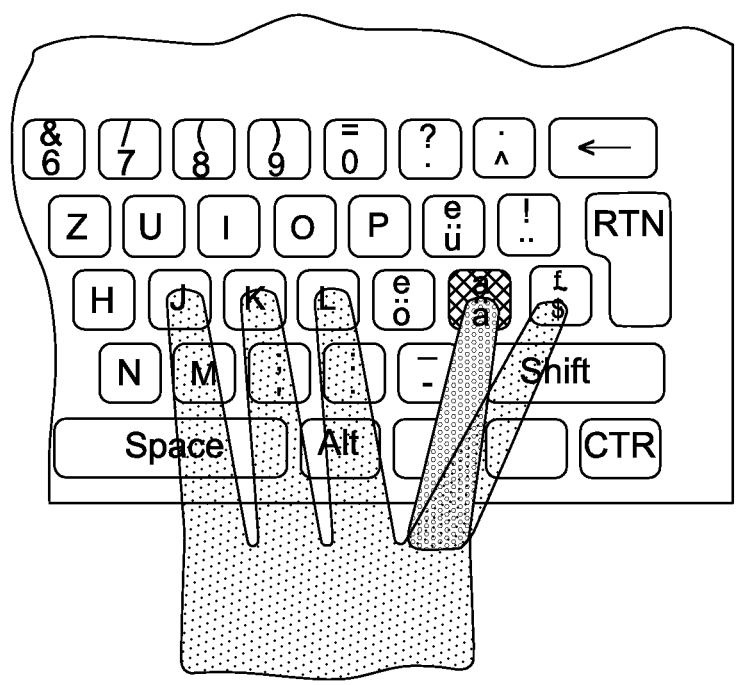
Figure 22:
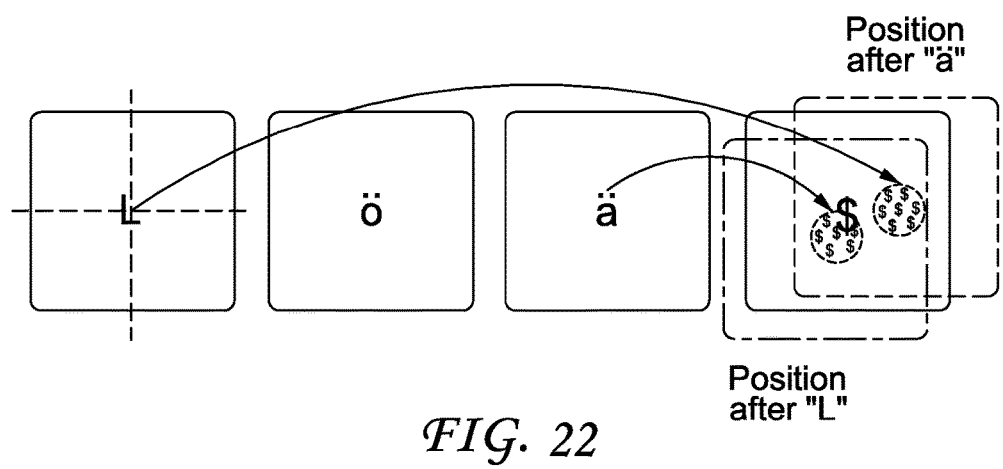
FIG. 22 shows exemplary hit footprints of the '$' key when the immediate last lasts are the 'L' key and the 'ä' key, respectively.

The inventors observed that the position where a key is hit may be depending on the immediately previous key that was hit. For example, FIG. 20 depicts the situation where the '$' key is hit after an key. The pinkie finger is straddled wide. By contrast, as shown in FIG. 21, if the previous key hit is an 'ä' (pressed by the pinkie finger too), the pinkie finger has to move only one key and thus produces a different hit footprint, as shown in FIG. 22. Thus, the inventors recognized that an adaptive keyboard can be further improved by having different key layouts that are given by the previously hit key. The processor 20 thus may store this association in the memory 30. For each key, the number of associations in the memory 30 may be up to the number of the other keys that are responsive by the same hand. For example, the processor 20 collects the footprint of a second key from a predefined number of hits to the second key, all of the hits immediately following a hit to a first key, at least repositions or resizes or reshapes the second key (the adapted second key) according to the collected footprint, computes the relative distance from the geometric center of the adapted second key to the geometric center of the first key, and stores the adapted second key, the relative position information with respect to the first key and an identification of the first key in the memory 30 indicating that the adapted second key is associated with the first key. When the first key is hit in the future, the processor 20 replaces the second key with the adapted second key in the memory 30 and positions the adapted second key in the position information retrieved from the memory 30. The processor 20 repeats the same for other adapted keys in the memory that are associated with the first key. Advantageously, for each key hit, the processor 20 presents a different keyboard with possibly all the keys adjusted or adapted to this key.

For this novel approach, a position of a first key may also be defined as a value from which the position of the first key can be derived from the geometric center of an immediately last hit key. In effect, the value allows determining the position of the first key from the geometric center of the last immediately last hit key. An example of such a value is a vector with the starting point at the geometric center of an immediately last hit key and the ending point at the geometric center of an adapted version of the first key. The adapted version of the first key with respect to a particular immediately last hit key is also stored in the memory 30 as associated with the associated vector. The associated vector indicates the position of said adapted first key relative to the immediately last hit key. Thus, by knowing the immediately last hit key, the processor 20 can retrieve the adapted version of the first key and display that adapted version of the first key in a position defined by the associated vector. A vector can be represented by length-angle pair in a polar system or the X-Y pair in a Cartesian system. The adapted version is derived from the footprint of the first key with respect to the immediately last hit key. The adapted version may only have one of the position, the size and shape changed, or any two of them, or all of them.

Figure 23:
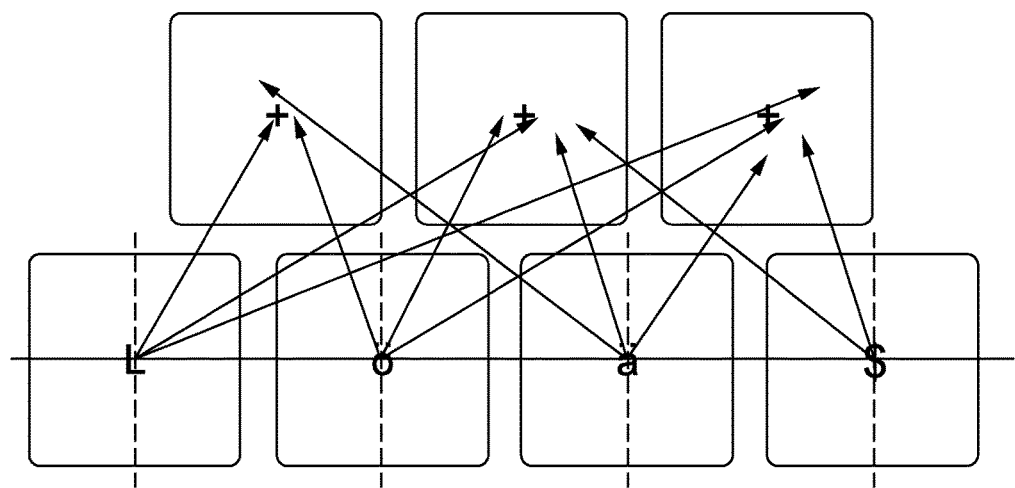
FIG. 23 shows exemplary vector representation for footprints of a key, in which each vector is associated with another key and an adapted version of the key.
Figure 24:
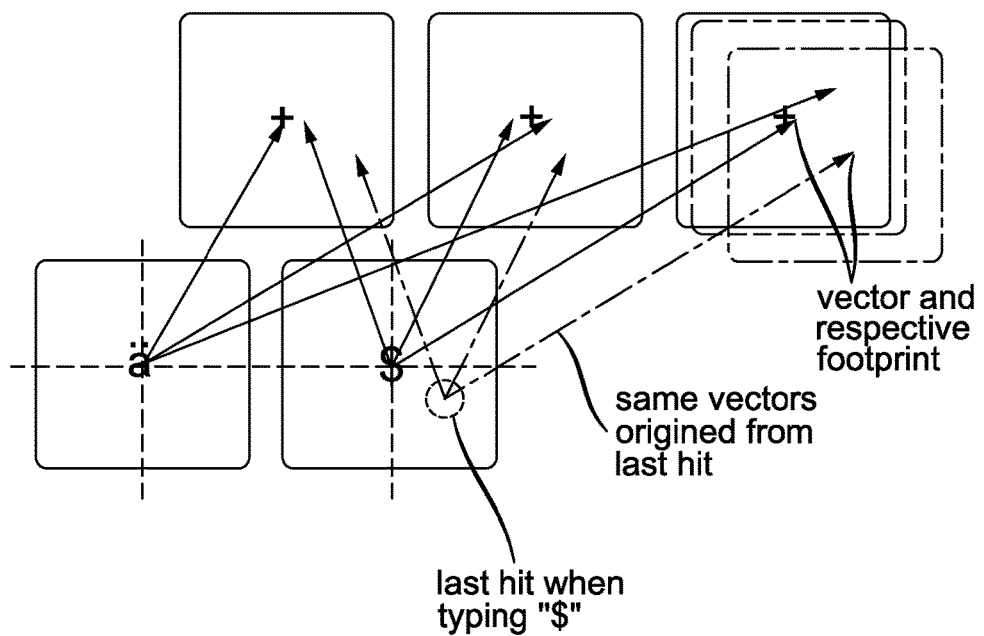
FIG. 24 shows that the position of a key is dynamically changed when another key is hit.

Each key now has a set of such values computed by the processor 20, which are vectors in this example, indicating the relative positions of the adapted versions of the immediately next hit keys, each set associating with one of all other keys or, to save computing power of the processor 20, the other keys that are responsible by the same hand. See FIG. 23 as an example. To help the readers better understand the vectors, the shapes of footprints are assumed to have the same square shape in FIGS. 23 and 24, the sizes of the adapted versions are not changed, and all the keys in the upper row are marked only with a '+' at the respective geometric centers. The geometric center of a different footprint is placed at the end (the arrow head) of a vector as shown in FIGS. 23 and 24. FIG. 24 further illustrates that when the position of a hit to the immediately last hit key changes, the geometric center of the footprint of the current hit key is changed as well. However, the association in the memory 30 needs not be changed because the position of the current hit key is determined from the relative position information in the memory 30 with respect to each immediately last hit key.

The set of vectors stored in the memory 30 may be considered a part of a signature of a user. It is a dynamic signature because it cannot be collected until a user starts an editing session and using the virtual keyboard by hitting keys.

According to another aspect of the invention, the processor 20 enables a user to add, move, and replace keys to fit the user's special needs. For certain symbols or special letters it may be desirable to place them on the top level of the virtual keyboard, so that the user has no need to invoke the symbol adding feature or press shift-, ctrl-, or alt-key to enter those symbols and letters. As an example, an American user would most probably use an American keyboard, but if the user has to use frequently the "Euro-sign" (€), the user would be glad to have direct access to this key instead of using the tedious procedure to add this symbol. By adding a new key with the desired symbol or replacing the symbol of an existing key according to the principles of the invention, the user can easily handle that situation. Instead of a single letter, the processor 20 may allow a text string like "Dear sirs", "Yours sincerely" to be assigned to a single key. Thus, the processor 20 allows a user to rearrange the keys directly when the keyboard is displayed. For example, the processor 20 allows a user to drag and drop the keys to the new position, to delete an unused key, to replace a key or to add a key.

Figure 25:
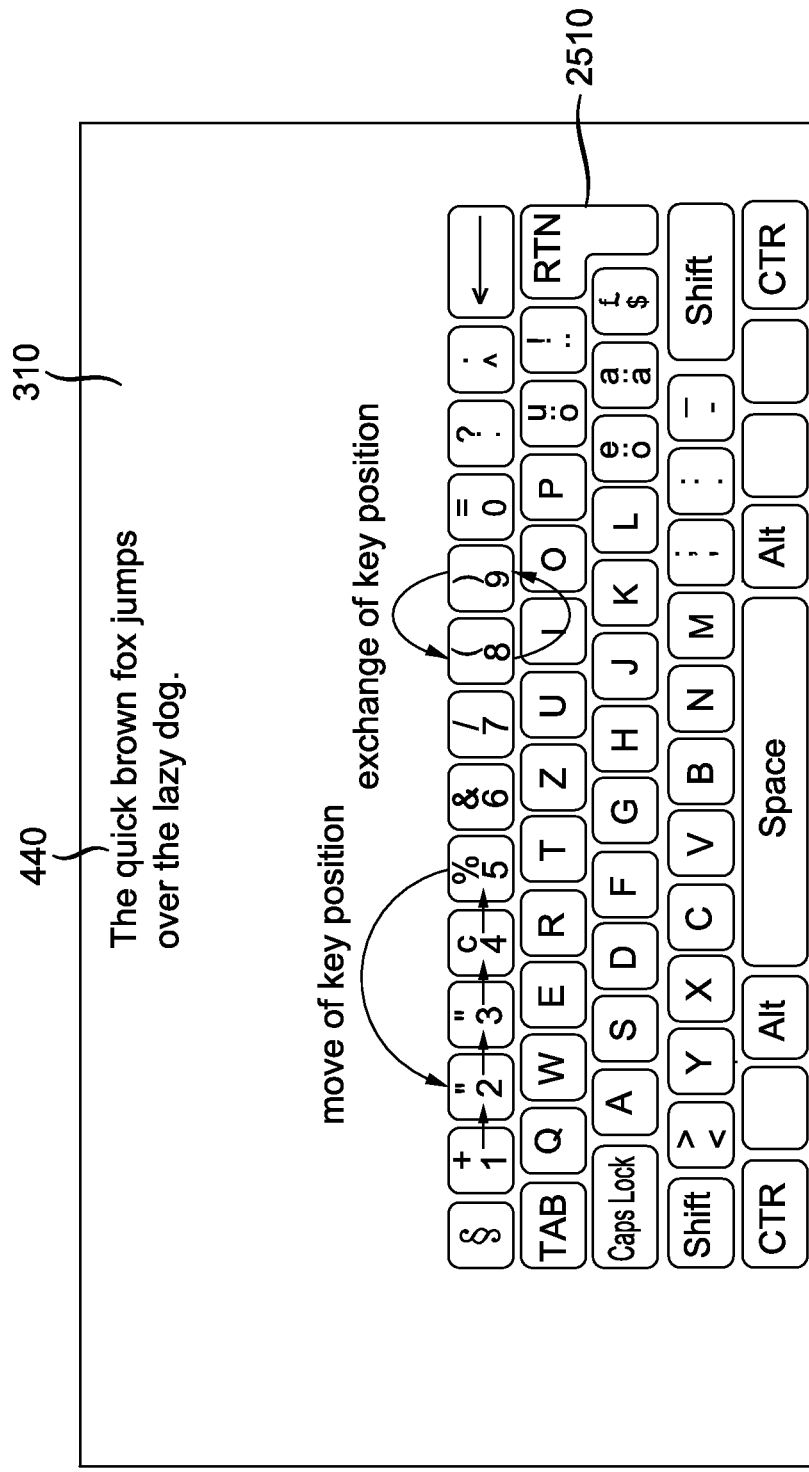
FIG. 25 shows exemplary gestures to move a key to a different location in a virtual keyboard.

In one embodiment, when the processor 20 detects two finger gestures, one from a first key to a second key, and the other from the second key to the first key, the processor 20 swaps the first and second keys. For example, in FIG. 25, the first and second keys are the '8' key and the '9' key, respectively, and the processor 20 exchanges positions of the two keys. In another embodiment, the processor 20 allows a user to drag a key using one finger to a desired position. When the processor 20 drops off the key to the desired position, the processor 20 moves the key originally located in the desired position to the location where the dragged key was located. In effect, the processor 20 exchanges the positions of the two keys.

In yet another embodiment, when the processor 20 drops off the dragged key, for example, the '5' key, in the desired position, for example where the '2' key is located, in the same row, the processor 20 shifts the affected key and those keys positioned between the affected key and the dragged key. In this example of FIG. 25, the '2', '3', and '4' are shifted to the right one position and the '5' key then takes up the original position of the '2' key.

Figure 26:
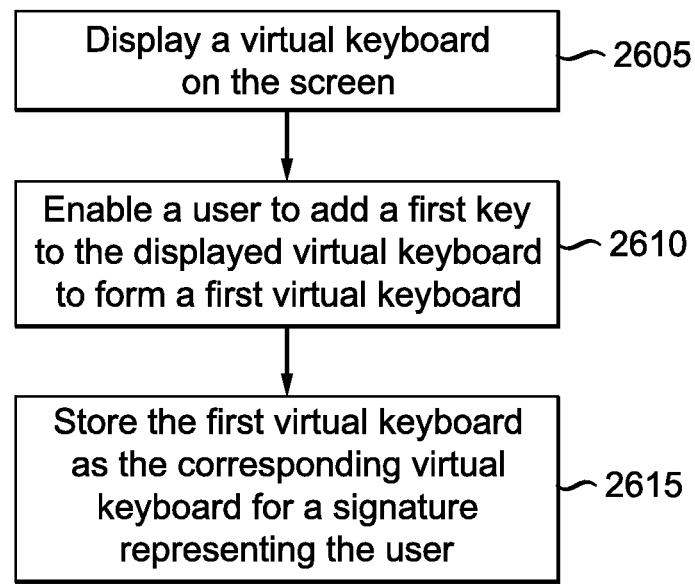
FIG. 26 shows an exemplary process for adding a key to a virtual keyboard.
Figure 27:
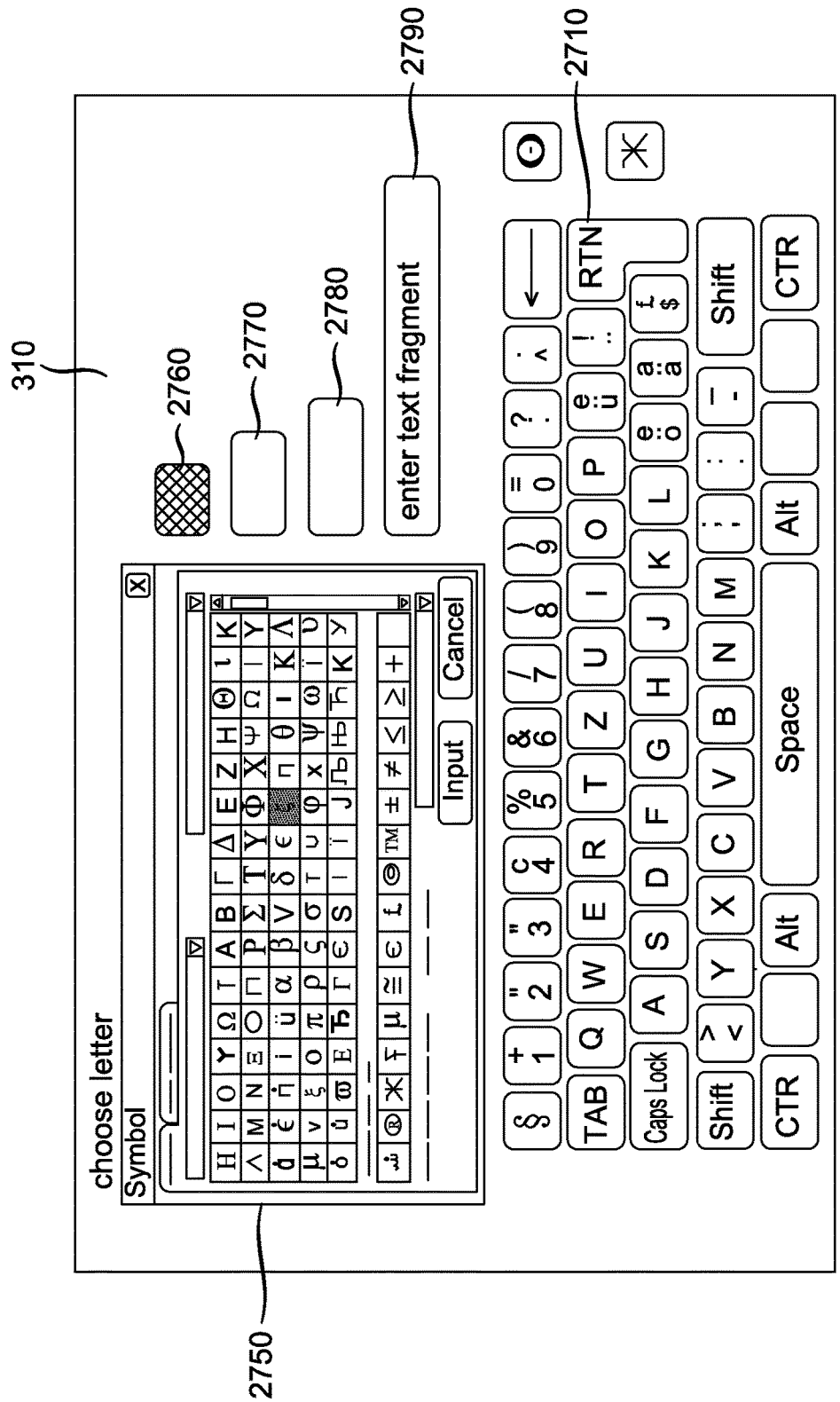
FIG. 27 shows an exemplary user interface to aid a user to add a key to a virtual keyboard.

FIG. 26 illustrates the process 2600 of adding keys. At step 2605, the processor 20 displays a virtual keyboard 2710, as shown in FIG. 27. The displayed virtual keyboard may be the one that the user is currently using or invoked during the initialization process as described above. At step 2610, the processor 20 enables a user to add a first key to the virtual keyboard 2710 to form a first virtual keyboard. To enable the user to add the first key, the processor 20 may display a conventional symbol table 2750, as shown in FIG. 27, in response to a command from the user to add a symbol. As well known, editing software normally provides a symbol table, so that a user can select a symbol from the table and enter that selected symbol into the edited document or field. The processor 20 thus enables the user to assign the added key the function of entering the selected symbols. The processor 20 may also enable the user to select a size of the key to be added. Illustratively, the processor 20 provides three different size boxes 2760, 2770, and 2780, as shown in FIG. 27 for user selection. This may occur in a training mode, which can be invoked by a user by touching a predefined position on the touch sensitive area or touching a position in the touch sensitive area for a predefined number of times. To add a symbol, a user should first touch one of the size boxes 2760, 2770, and 2780, and then selects a symbol from the table 2750, as shown in FIG. 27. If no size box is selected, the processor 20 should select one of them, for example, the size box 2760, as a default. The selected symbol is preferably displayed in the selected size box. The user can then drag the selected size box with the selected symbol displayed in it to a desired position. The processor 20 may automatically adjust the font size of a text string displayed with a new key or abbreviate the text string or both to fit the space allocated for that new key.

In order to facilitate the situation where the added key is assigned a function other than entering a symbol in the symbol table 2750, the processor 20 may also provide a text box 2790. To add a key representing a text string, a user first selects one of the size boxes, enters the text string in the text box 2790 and drags the selected size box to a desired position. In the exemplary virtual keyboard 2710 having an American style layout, the "$ (£)" key, the "Θ" key, and the "Ж" key are added. Thus, a key can now hold even foreign letters, text fragments, symbols, pictures, graphics, or a multimedia function (sound, video or an action) that can be used/initiated by a user hitting that added key in that keyboard. To provide multimedia function, the processor 20 should provide an interface for a user to add a key with a multimedia function. For example, a multimedia box is displayed, and when the multimedia box is touched by the user, the processor 20 provides a browsing function for the user to select a multimedia file to be associated with that key. The selected file name is entered to the text box 2790. In effect, the text box (field) 2790 can be used to enter a text string, a graphics, a symbol not in the symbol table 2750, the file name of an audio file, and the file name of a video file. When the user signals the end of a key adding session by, for example, closing the symbol table, the processor 20 at step 2615 stores the new virtual keyboard including the added keys in a memory to be associated with a signature of said user.

The processor 20 detects the signature of the user as described above with respect to the initialization process. If the added key is hit, the processor 20 will perform its assigned function, such as entering a symbol, entering a string, playing back an audio, or playing back a video.

Figure 28:
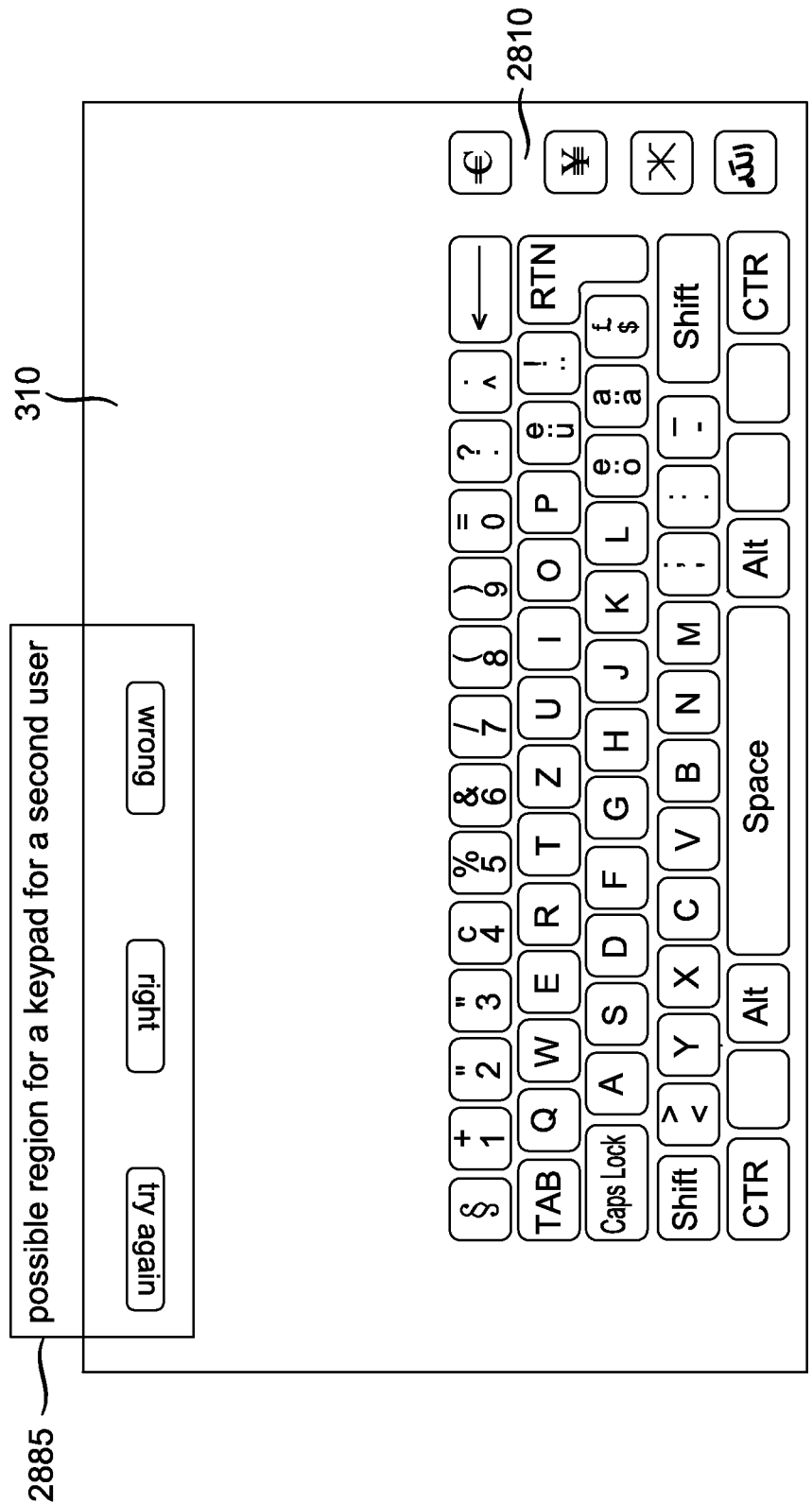
FIG. 28 shows that multiple virtual keyboards can be created by using the key adding feature as shown in FIG. 26.

Using the key adding feature, a user is able to cause the processor 20 to display two virtual keyboards, such as keyboards 2810 and 2895 shown in FIG. 28. The keys in the secondary keyboard 2895 can be added as described above. The secondary keyboard 2895 may be used by the user or a different user for some purposes, such as educational, gaming or other multi-user purposes.

It should be noted that like other existing keys in the virtual keyboard, the added keys can also be dynamically adapted using the exemplary process as discussed above with respect to FIG. 6.

During an editing session, the user might step back to the initialization process by providing user signals as described above with respect to the initialization process.

In another embodiment, the virtual keyboard can be displayed transparent, allowing a user continuing to see the displayed content while typing, as shown in FIG. 4. The degree of transparency may vary over the keyboard in relation to the use, importance or interactivity of the keys such that the user has a better overview over the whole docket/screen. This transparency leads to a larger area useable for the object to be written in.

In yet another embodiment, only part of the virtual keyboard is displayed transparent. For example, the row for the number keys in FIG. 4 is displayed transparent, but other parts of the virtual keyboard 410 are not.

In yet another embodiment, the virtual keyboard is transparent but when a user starts striking/hitting the keyboard, the virtual keyboard becomes opaque and if the user does not stroke for a predefined time, the virtual keyboard becomes transparent again.

Future tablet-PCs may have buttons or a touch sensitive area on the rear side or edges such that the user does not have to move the grip for certain actions. Those keys are activated by touching certain predefined area located on the rear side or edges, which contains touch-sensitive elements. The touch of those keys is detectable by the processor 20. This is an example that the entire second portion or some portion of the second portion of the touch-sensitive elements is not arranged in a consecutive manner with the first portion of the touch-sensitive elements and the screen 310. By contrast, the first portion and the entire second portion of the touch-sensitive elements in FIG. 4 are arranged in a consecutive manner.

Figure 29:
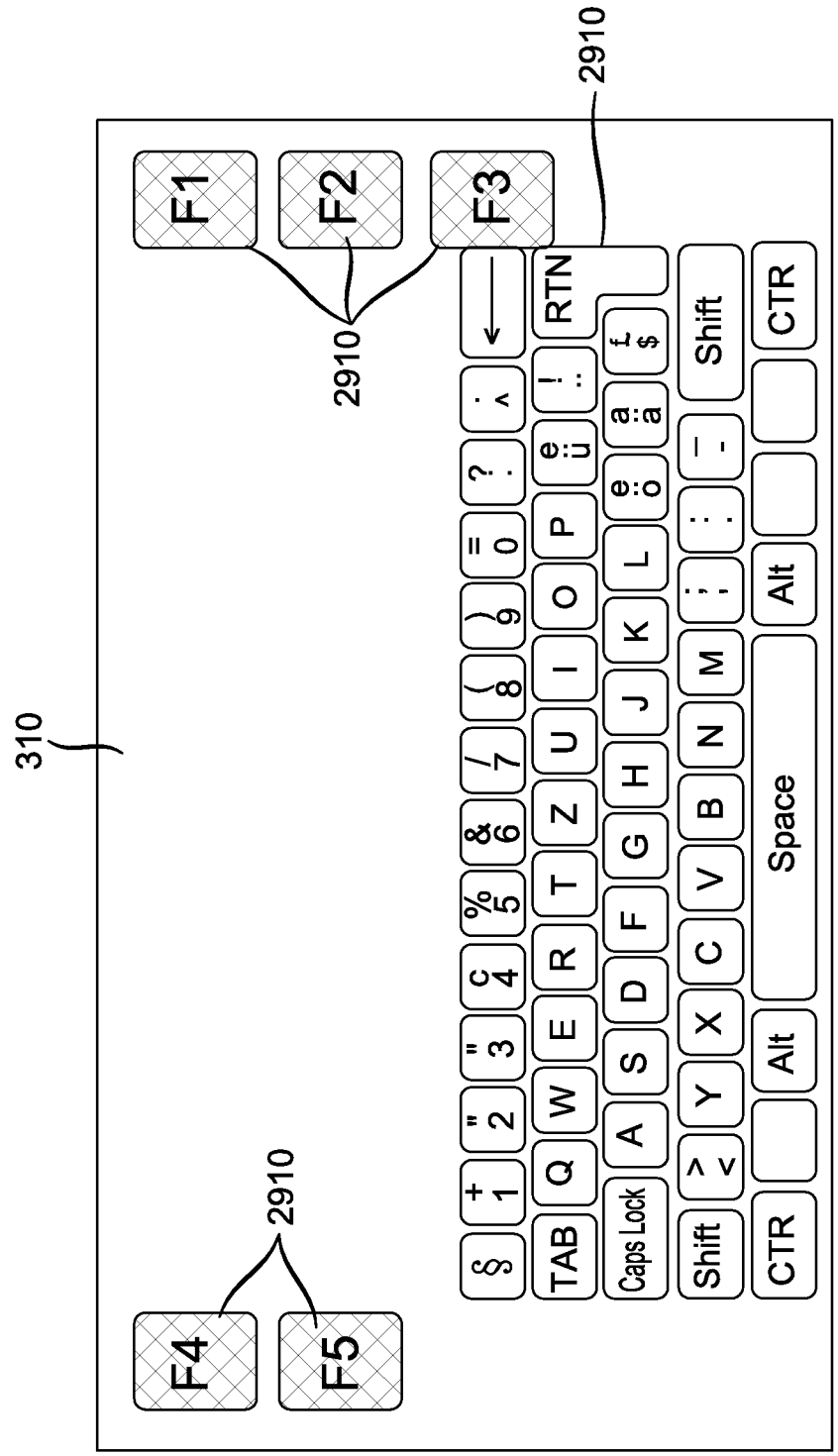
FIG. 29 shows that virtual keys can be on the back of a touch screen device.

These rear virtual keys can be displayed on the screen 310 in the front-side (fully, transparent or only when interaction is demanded) to show their corresponding positions on the rear side, but a user must still touch the corresponding areas in the rear side. Touching the displayed keys on the screen 310 produces no effect. These keys can still be adaptive as the keys in the virtual keyboard in the front side and can be saved as part of the corresponding virtual keyboard in the memory 30. For example, as shown in FIG. 29, in addition to the keys on the front side, five keys located on the rear side are also displayed: 'F1', 'F2', 'F3', 'F4', and 'F5'. After adaptation, at least one of the shapes, sizes and locations of the five keys may change.

In a further embodiment, the virtual keys from the rear side can be brought to the front side by pressing an activating key or group of keys like "CTRL" and "Shift" keys. This will allow the user to activate "rear side keys" from the front side from corresponding virtual keys on the display 120. In a preferred embodiment, this change is visualized by changing, for example, the color of the corresponding virtual keys on the display 120.

To move a virtual keyboard to a different location, a user may keep the multiple fingers, for example, three or four fingers from either one or both hands, on the keys for a predefined time, for example 2 seconds. When the processor 20 detects such a situation, the processor 20 recognizes that the user wants to move the keyboard to a different location. When the processor 20 detects that the fingers start sliding, the processor 20 moves the virtual keyboard accordingly.

To quickly make the keyboard disappeared; the user should make a swift (wipe) movement. To get the keyboard back, the user simply places the fingers on the display as previously described.

Figure 31:
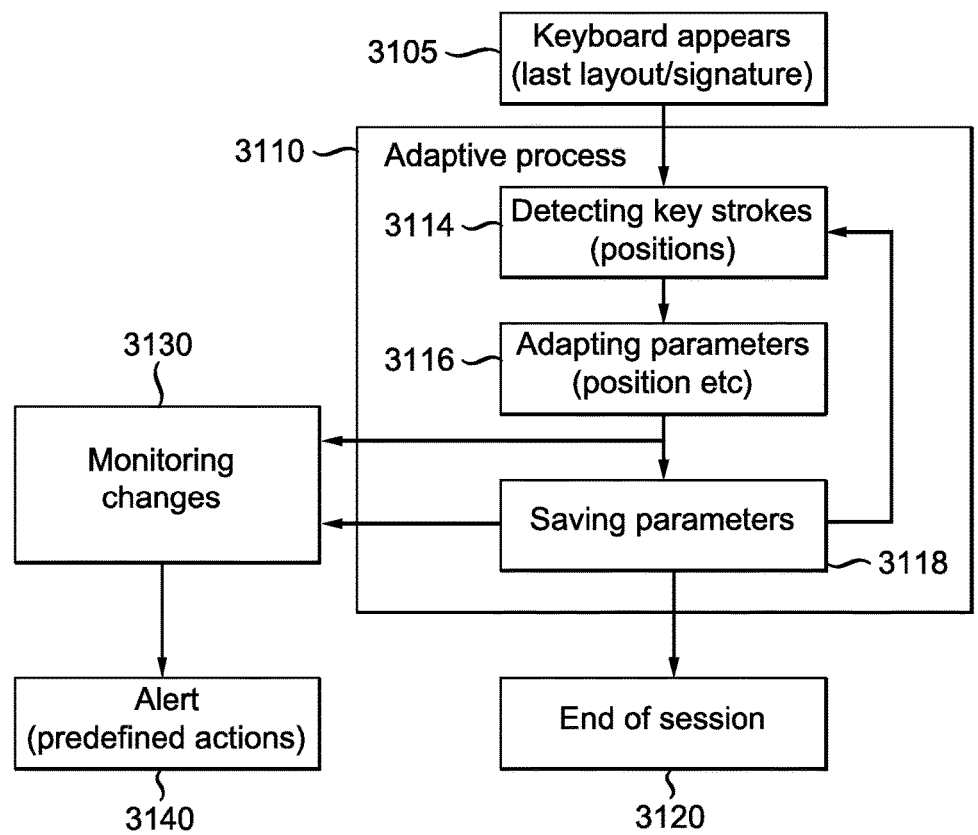
FIG. 31 shows an exemplary process that monitors changes of signature.

As discussed in FIG. 6, once the processor 20 detects a signature with a corresponding keyboard, the processor 20 retrieves the corresponding keyboard for the user to use. As mentioned previously, the set of values, which are vectors in this example, stored in the memory 30 may be considered a part of a dynamic signature of a user. According to the principles of the invention, during an editing session, the processor 20 can detect if there is a significant change to the stored dynamic signature and if there is, the processor 20 can inform the user of such a change. FIG. 31 illustrates such a process 3100. At step 3105, the processor 20 displays a corresponding virtual keyboard according, for example, the process 600, as described in FIG. 6. The displayed virtual keyboard should be the last adapted virtual keyboard. At step 3110, the processor 20 adapts the displayed virtual keyboard during the editing session according, for example, the processes described previously. Briefly, the step 3110 includes a step 3114 for detecting key strokes (hits), a step 3116 for determining adapting parameters (such as a relative position represented by, for example, a vector as described previously) and the processor 20 adapts the keyboard accordingly, a step of saving the determined parameters.

Before saving the determined adapting parameters, the processor 20 compares the determined adapting parameters with the existing adapting parameters at step 3130. If there is a significant change, the processor 20 alerts the user by, for example, demanding a new identification, demanding an additional authentication method, activating a camera, sending an alert, making a remark in the system or a log file indicating that the dynamic signature has been altered by a suspicious user, or any combination thereof.

The editing session ends at step 3120 and the virtual keyboard may automatically disappear.

Figure 32:
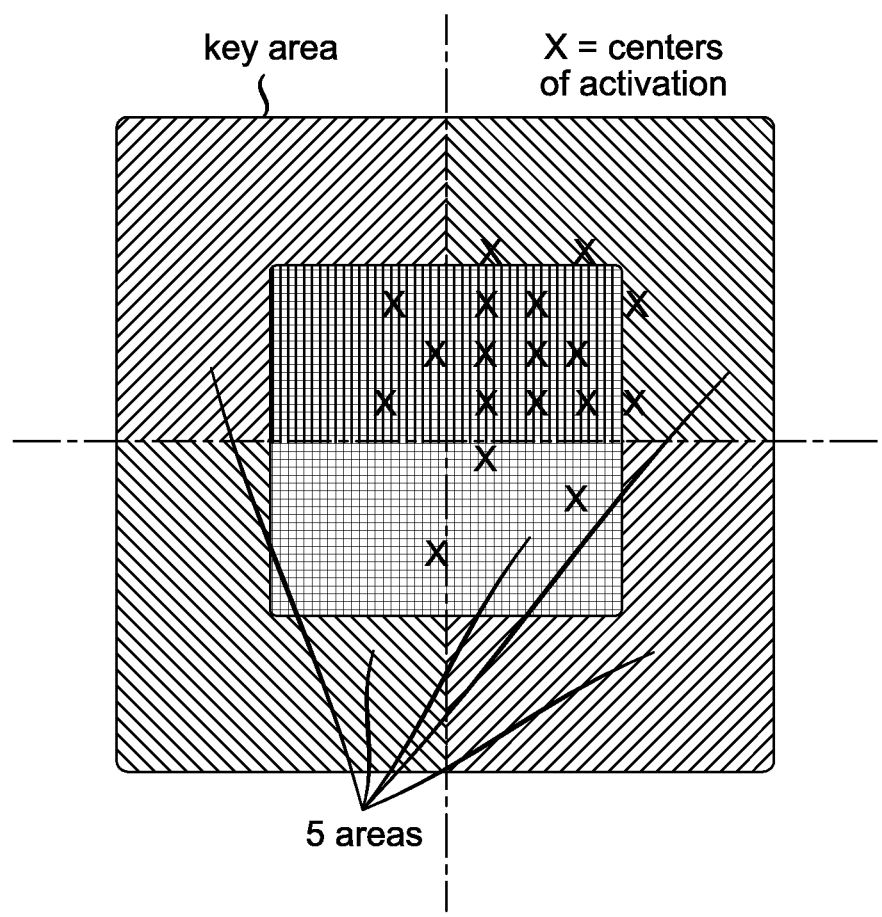
FIG. 32 shows that in monitoring changes in dynamic signature, a key can be divided in five areas.

In an exemplary embodiment, each virtual key is divided in to several areas, such as 5 areas, center, top-right, top-left, bottom-right, bottom-left, as shown in FIG. 32 in creating the vectors, and the processor 20 monitors only a predefined set of keys, for example, 10 predefined keys. The principles of the invention are not limited to 10 keys, any number or all of the keys can be used, and any number of subdivisions can be used in a key. With this example, there are 5 to the power of 10 variations and more than sufficient to distinguish different users. A significant change is that 20 percents of the monitored keys have a change of the magnitude of a vector of more than 20 percents.

In one embodiment, the processor 20 can simply monitor the rhythm of typing and records that rhythm as part of the dynamic signature of a user. The simple "thumbing," the "hunt and peck" using, for example, two or three fingers, typing by a novice user, and professional typing certainly deliver different rhythm. A change of rhythm by 20 percents is considered significant. In yet another embodiment, both rhythm and vector changes are monitored.

Since process 3100 is preferred to be running in the background, unaware by the user, process 3100 provides additional security to the system.

As described above, the present invention provides, among other things, a method for enabling a user to use a virtual keyboard even if the some keys in the virtual keyboard are partially or completely invisible, a method for adapting a virtual keyboard to match the sizes and positions of the fingers, a method for dynamically adapting each key to match the typing habit of a user represented by a signature, and a method for adding keys to a virtual keyboard. Each of the added keys can also be dynamically adapted. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A touch screen device comprising:
a touch screen; a sensing layer comprising touch-sensitive elements, a first portion of said sensing layer being arranged inside said touch screen and
a second portion of said sensing layer is arranged outside of said touch screen,
wherein the first portion of the sensing layer and the second portion of the sensing layer are adjacent to each other in a consecutive non-overlapping manner on front of the touch screen device; and
a processor coupled to said touch screen and said sensing layer,
said processor
causing to display a virtual keyboard including a first virtual key and a second virtual key to a first portion of said touch screen in a first position on said first portion of said sensing layer;
moving said virtual keyboard from said first position of said touch screen responsive to a user input to a second position in which said first virtual key is partially displayed on said touch screen such that said first virtual key has a visible portion and an invisible portion while at least a second virtual key is displayed on the touch screen or
moving the virtual keyboard to a third position responsive to a user input such that said first key is completely invisible and covers a second portion of said second portion of said sensing layer while at least a second key of said virtual key board is displayed on the touch screen overlaying the first portion of said sensing layer;
wherein
the visible portion of said first virtual key covers a first portion of said first portion of said sensing layer and is displayed on the touch screen and
the invisible portion of said first virtual key covers a first portion of said second portion of said sensing layer and is not displayed when the virtual keyboard is in the second position; and
said first virtual key causing said processor to execute a particular function assigned to the first key in response to either detecting a touch on the invisible portion of said first virtual key of the virtual keyboard in the second position or detecting a touch on the completely invisible said first virtual key of the virtual keyboard in the third position.

2. The touch screen device of claim 1, wherein said processor is operative to detect a signal indicating which one of said touch-sensitive elements has been hit.

3. The touch screen device of claim 2, wherein when said processor moves said virtual keyboard to said second position, some virtual keys including said first virtual key are partially displayed on said touch screen
such that each of the said some virtual keys has a visible portion and an invisible portion, wherein
the visible portion of each of the said some virtual keys covers said first portion of said first portion of said sensing layer and is displayed on the touch screen and
the invisible portion of each of the said some virtual keys covers said first portion of said second portion of said sensing layer and is not displayed.

4. The touch screen device of claim 3, wherein said virtual keyboard comprises a plurality of rows, and said some keys are arranged in one of said rows.

5. The touch screen device of claim 1, further comprising a third portion of said sensing layer arranged outside of said touch screen, wherein said first portion of said sensing layer and said third portions of said sensing layer are non-consecutive.

6. The touch screen device of claim 5, wherein said touch screen is located in a first side of said touch screen device and said third portion is located on a second side other than said first side of said touch screen device.

7. The touch screen device of claim 6, wherein said third portion includes a third key and said processor displays on said touch screen a fourth key indicating a location of said third key in said second side.

8. The touch screen device of claim 7, wherein when one of said third and fourth keys is hit, said processor performs a second function assigned to said second key.

9. A method for presenting a virtual keyboard by a touch screen device, the method comprising displaying the virtual keyboard comprising a plurality of keys by the touch screen device,
  the touch screen device comprising a touch screen and a sensing layer comprising touch-sensitive elements,
    a first portion of said sensing layer being arranged inside said touch screen and
    a second portion of said sensing layer is arranged outside of said touch screen,
      wherein the first portion of the sensing layer and the second portion of the sensing layer are adjacent to each other in a consecutive non-overlapping manner on front of the touch screen device; and
      said displayed virtual keyboard includes a first virtual key and a second virtual key, wherein all of said virtual keyboard is displayed in a first position on said touch screen and covers said first portion of said sensing layer;
moving said virtual keyboard, in response to a user input, from said first position to a second position in which said first key of said virtual keyboard is partially displayed on said touch screen such that said first virtual key has a visible portion and an invisible portion while at least a second virtual key is displayed on the touch screen or
moving the virtual keyboard to a third position responsive to a user input such that said first key is completely invisible and covers a second portion of said second portion of said sensing layer while at least a second key of said virtual key board is displayed on the touch screen overlaying the first portion of said sensing layer; wherein
  said visible portion of first key covers a first portion of said first portion of said sensing layer and is displayed on the touch screen and
  said invisible portion of said first key covers a first portion of said second portion of said sensing layer and is not displayed; and
said first key performing a particular function assigned to said first key in response to either detecting a touch on the invisible portion of said first virtual key of the virtual keyboard in the second position or detecting a touch on the completely invisible said first virtual key of the virtual keyboard in the third position.

10. The method of claim 9, wherein said virtual keyboard comprises a plurality of rows, and said some keys are arranged in one of said rows.

11. The method of claim 9, further comprising a third portion of said sensing layer arranged outside of said touch screen,
  wherein said touch screen is located on a first side of said touch screen device
  and said third portion of said sensing layer is located on a second side of said touch screen device other than said first side,
  said third portion of said touch-sensitive elements include a third key, and said method further comprises displaying on said screen a fourth key indicating a location of said second key in said second side.

12. The method of claim 11, further comprising when said third key is hit, performing a second function assigned to said third key.

13. The method of claim 12, further comprising when said fourth key is hit, performing a second function assigned to said third key.

14. A computer program product stored in non-transitory computer-readable storage media comprising computer-executable instructions for displaying a virtual keyboard on a touch screen of a touch screen device, the instructions comprising:
displaying the virtual keyboard comprising a plurality of keys by the touch screen device,
  the touch screen device comprising a touch screen and a sensing layer comprising touch-sensitive elements,
    a first portion of said sensing layer being arranged inside said touch screen and
    a second portion of said sensing layer is arranged outside of said touch screen,
      wherein the first portion of the sensing layer and the second portion of the sensing layer are adjacent to each other in a consecutive non-overlapping manner on front of the touch screen device; and
      said displayed virtual keyboard includes a first virtual key and a second virtual key, wherein all of said virtual keyboard is displayed in a first position on said touch screen and covers said first portion of said layer;
moving said virtual keyboard, in response to a user input, from said first position to a second position in which said first key of said virtual keyboard is partially displayed on said touch screen such that said first virtual key has a visible portion and an invisible portion while at least a second virtual key is displayed on the touch screen or moving the virtual keyboard to a third position responsive to a user input such that said first key is completely invisible and covers a second portion of said second portion of said sensing layer while at least a second key of said virtual key board is displayed on the touch screen overlaying the first portion of said sensing layer; wherein
  said visible portion of first key covers a first portion of said first portion of said sensing layer and is displayed on the touch screen and
  said invisible portion of said first key covers a first portion of said second portion of said sensing layer and is not displayed; and
said first key performing a particular function assigned to said first key in response to either detecting a touch on the invisible portion of said first virtual key of the virtual keyboard in the second position or detecting a touch on the completely invisible said first virtual key of the virtual keyboard in the third position.

\* \* \* \* \*